(12) United States Patent
Kanehisa et al.

(10) Patent No.: US 6,309,028 B1
(45) Date of Patent: Oct. 30, 2001

(54) BICYCLE HUB

(75) Inventors: Takanori Kanehisa; Koshi Tabe, both of Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/528,191

(22) Filed: Mar. 17, 2000

Related U.S. Application Data

(63) Continuation-in-part of application No. 09/494,544, filed on Jan. 31, 2000.

(51) Int. Cl.[7] ................ B60B 1/04; B60B 27/00
(52) U.S. Cl. .......................... 301/110.5; 301/59
(58) Field of Search ................. 301/58, 59, 61, 301/110.5, 110.6

(56) References Cited

U.S. PATENT DOCUMENTS

| | | | |
|---|---|---|---|
| 549,740 | * 11/1895 | McGlinchey et al. | 301/59 |
| 553,616 | 1/1896 | Handloser . | |
| 2,937,905 | 5/1960 | Altenburger | 301/58 |
| 5,445,439 | 8/1995 | Dietrich | 301/55 |
| 5,531,510 | * 7/1996 | Yamane | 301/110.5 |
| 5,795,036 | 8/1998 | Campagnolo | 301/59 |
| 5,882,088 | 3/1999 | Yahata | 301/110.5 |
| 5,909,931 | * 6/1999 | Tabe | 301/110.5 |
| 6,010,197 | 1/2000 | Crosnier et al. | 301/59 |

FOREIGN PATENT DOCUMENTS

| | | | |
|---|---|---|---|
| 99859 | 12/1897 | (DE) | B60B/1/04 |
| 8703618 | 7/1987 | (DE) | B60B/1/14 |
| 8814753 | 2/1989 | (DE) | B60B/1/14 |
| 9416689 | 4/1996 | (DE) | B60B/1/14 |
| 19528382 | 2/1997 | (DE) | B60B/27/00 |
| 0764551 | 3/1997 | (EP) | B60B/1/04 |
| 479141 | * 6/1915 | (FR) | 301/59 |
| 2417402 | 9/1979 | (FR) | B60B/27/00 |
| 2302846 | 2/1997 | (GB) | B60B/27/02 |
| 4511628 | 5/1970 | (JP) . | |
| 4963866 | 6/1974 | (JP) . | |
| 5986724 | 5/1984 | (JP) . | |

* cited by examiner

Primary Examiner—Russell D. Stormer
(74) Attorney, Agent, or Firm—Shinjyu Global IP Counselors, LLP

(57) ABSTRACT

A bicycle hub is provided with spoke openings that extend into the interior of the hub. The bicycle hub basically has a hub axle, a hub body and seals arranged in the hub body. The hub axle has a center axis extending between a first end and a second end. The hub body has an interior passageway with the hub axle being rotatably supported therein. The hub body also has first and second spoke openings circumferentially arranged around the ends of the hub body. A first seal is arranged in the interior passageway of the hub body and adjacent the first spoke openings to isolate the first spoke openings from the hub axle. A seal support is located beneath the first seal to prevent radial inward movement of the first seal. A second seal is arranged in the interior passageway of the hub body and adjacent the second spoke openings to isolate the second spoke openings from the hub axle. Preferably, the spoke opening covers are located in grooves of the hub body to seal the insertion portions of the first and second spoke openings.

24 Claims, 19 Drawing Sheets

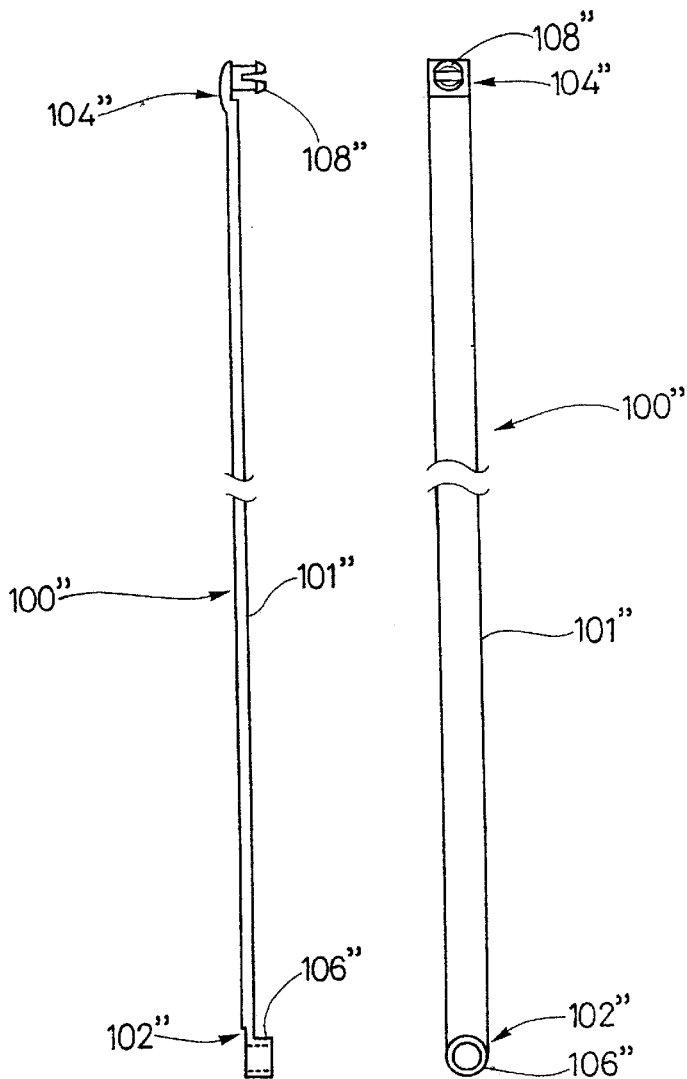
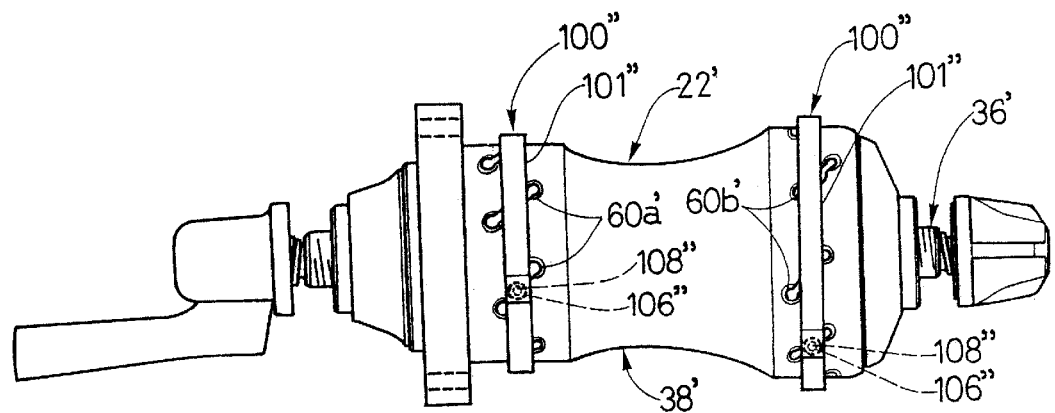
FIG. 23  FIG. 24
FIG. 25

BICYCLE HUB

CROSS-REFERENCE TO RELATED APPLICATIONS

This application is a continuation-in-part application of U.S. patent application Ser. No. 09/494,544, filed on Jan. 31, 2000. The entire disclosure of U.S. patent application Ser. No. 09/494,544 is hereby incorporated herein by reference.

BACKGROUND OF THE INVENTION

1. Field of the Invention

This invention generally relates to a bicycle hub with spoke openings in the tubular portion of the hub body. More specifically, the present invention relates to a bicycle hub with a seal that isolates the spoke openings from the remainder of the interior of the hub body.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. Recently, the braking systems for bicycles have included the use of disc brakes. The use of disc brakes has resulted in modifications to the bicycle hub of the bicycle wheel so that a brake rotor can be mounted thereon.

The most basic bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with an enlarged head or flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim.

With a spoke constructed in this manner, the nipples are installed in nipple holes formed in the rim. The spokes are inserted sideways through the holes in the hub flange until the enlarged head or flanges of the spokes engaging the areas surrounding the holes in the hub flange. The male threads on the ends of the spokes are threaded into the female threads of the spoke nipples installed in the openings of the rim.

When the hub is a brake disc hub or is a rear hub, installation and/or replacement of the spokes can be difficult. In the case of a disk brake hub, one end of the hub usually has a rotor mounting portion. Often, the rotor mounting portion is a plurality of blind bores that receive bolts to directly mount the brake disc rotor to the end of the hub. Thus, the brake disc rotor makes it difficult to insert the spokes in a sideways direction. Likewise, if the hub is a rear hub, the sprockets can be obstacles to install or replace spokes.

One problem with spoke openings in the tubular portion of the hub body is that contaminants can enter the hub body through the spoke openings. When dirt gets into the hub body, the rotation of the hub body relative to the hub axle can be significantly impair.

In view of the above, there exists a need for a bicycle hub with a spoke seal which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub having a seal with a seal support for isolating the spoke openings form the interior of the hub body.

Another object of the present invention is to provide a bicycle hub having a seal with a seal support that aids in the installation of the spokes.

Another object of the present invention is to provide a bicycle hub that has first spoke openings with an insertion portion and a retaining portion, and a spoke opening cover located along a first annular groove intersecting the insertion portions.

Another object of the present invention is to provide a bicycle hub that is relatively lightweight in that no spoke flanges are needed.

The foregoing objects can be attained by providing a bicycle hub for use with bicycle spokes. The bicycle hub comprising a hub axle, a hub body, a first flexible seal arranged in the hub body and a first rigid seal support. The hub axle has a center axis extending between a first end and a second end. The hub body has an interior passageway with the hub axle being rotatably supported therein. The hub body has a set of first spoke openings circumferentially arranged around the hub body. The first flexible seal is arranged in the interior passageway of the hub body and adjacent the first spoke openings to isolate the first spoke openings from the hub axle. The first rigid seal support is located beneath the first flexible seal to radially support the first flexible seal.

The foregoing objects can further be attained by providing a bicycle hub for use with bicycle spokes. The bicycle hub comprising a hub axle and a hub body. The hub axle has a center axis extending between a first end and a second end. The hub body has an outer surface with a first annular groove, an interior passageway with the hub axle being rotatably supported therein and a set of first spoke openings circumferentially arranged around the hub body. Each of the first spoke openings has an insertion portion located along the first annular groove and a retaining portion. The insertion portion has a large width that permits an enlarged head portion of a spoke to pass therethrough. The retaining portion has a width that is smaller than the width of the insertion portion to retain the enlarged head portion of the spoke therein.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 23 is an inside elevational view of a third embodiment of a spoke opening cover for the hubs of the present invention;

FIG. 24 is an edge elevational view of the spoke opening cover illustrated in FIG. 23 for the hubs of the present invention;

FIG. 25 is a side elevational view of the front brake disc hub with the spoke opening cover illustrated in FIGS. 23 and 24 installed thereon;

DETAILED DESCRIPTION OF THE PREFERRED EMBODIMENTS

Figure 1:
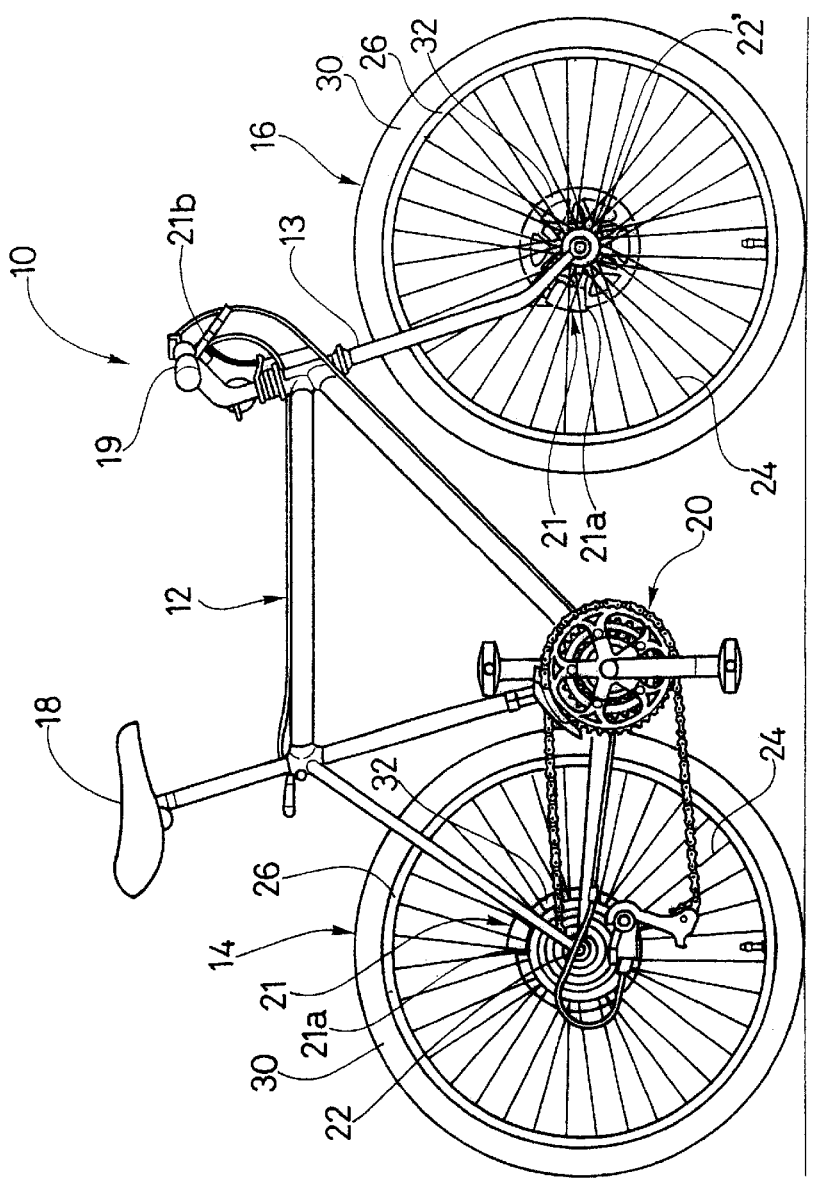
FIG. 1 is a side elevational view of a conventional bicycle with front and rear brake disc hubs in accordance with a first embodiment of the present invention.
Figure 2:
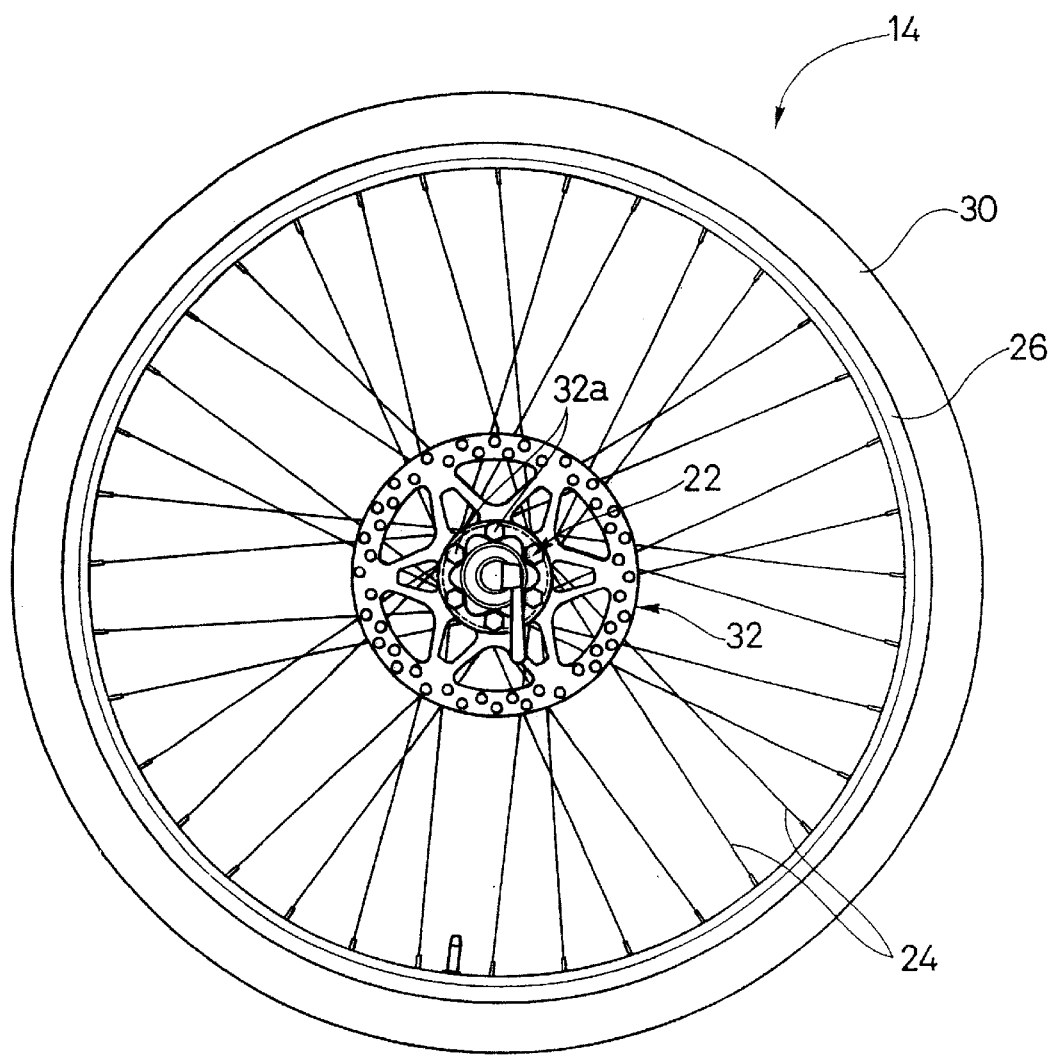
FIG. 2 is a side elevational view of the rear wheel of the bicycle illustrated in FIG. 1 with the sprockets removed.
Figure 3:
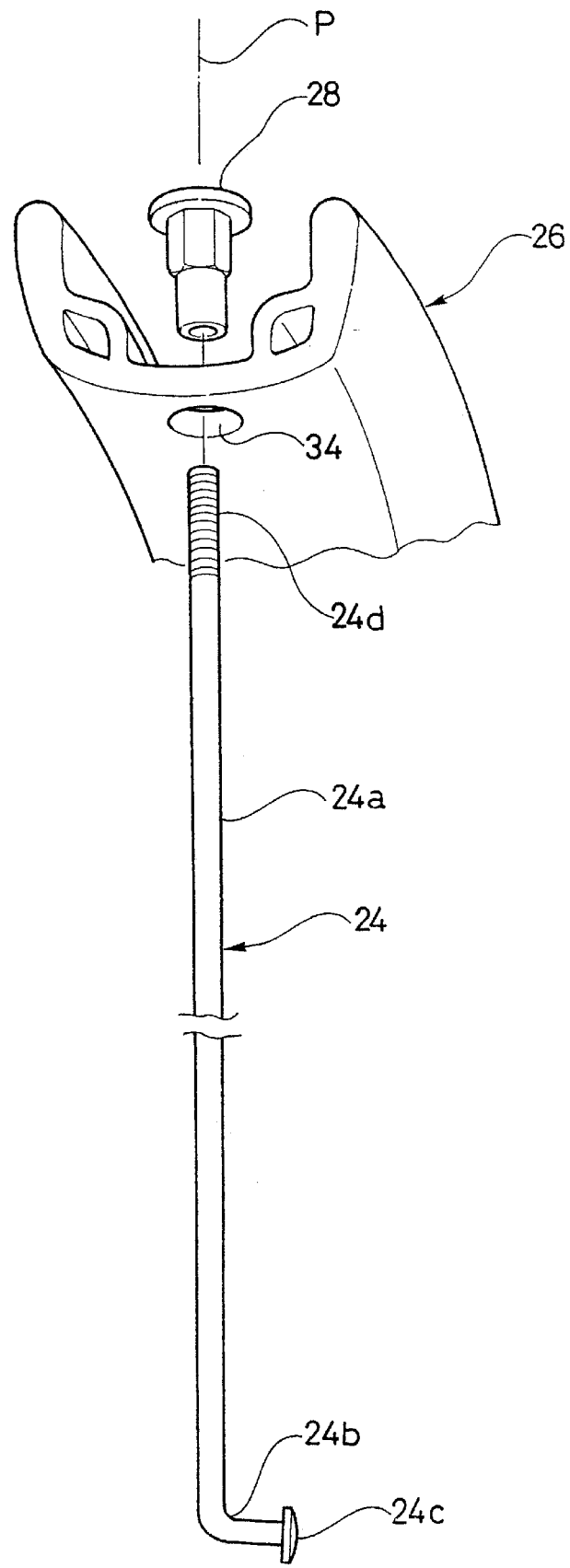
FIG. 3 is partially exploded perspective view of the rim, one of the spokes and one of the spoke nipples of the bicycle illustrated in FIG. 1.

Referring initially to FIGS. 1–3, a bicycle 10 is illustrated with certain parts being modified in accordance with the present invention as discussed below. The bicycle 10 basically has a frame 12 with a front fork 13 movably coupled thereto. A rear wheel 14 is rotatably coupled to a rear portion of the frame 12, while a front wheel 16 is rotatably coupled to the front fork 13. The frame 12 also has a seat 18 adjustably coupled to frame 12, a handlebar 19 coupled to front fork 13 for turning front wheel 16 and a drive train 20 for propelling bicycle 10. The bicycle 10 is also provided with a pair of disc brake assemblies 21 having a caliper 21a and a brake lever 21b.

Since these parts of bicycle 10 are well known in the art, these parts will not be discussed or illustrated in detail herein, except as they are modified in accordance with the present invention. Moreover, various conventional bicycle parts such as brakes, derailleurs, additional sprocket, etc., which are not illustrated and/or discussed in detail herein, can be used in conjunction with the present invention.

As seen in FIG. 2, the rear wheel 14 has a rear hub 22, a plurality of spokes 24 extending outwardly from the rear hub 22, a rim 26 coupled to the outer ends of spokes 24 by spoke nipples 28, and a tire 30 located on the outer surface of rim 26. The rear hub 22 is also provided with a brake disc rotor 32 that is attached to the rear hub 22 by six blots 32a and six nuts 32b, as explained below. While the illustrated embodiment is a thirty-six spoke wheel, it will be apparent to those skilled in the art from this disclosure that other spoke arrangements are possible without departing from the present invention. For example, a thirty-two spoke wheel or a forty spoke wheel can be constructed in accordance with the present invention without departing from the present invention. Basically, the number of spoke openings depends upon the rim to be used with the hub of the present invention.

Preferably, the spokes 24, the rim 26 and spoke nipples 28 are all conventional parts that are used with the rear hub 22 of the present invention as seen in FIG. 3. In other words, the unique design of the rear hub 22 allows it to be used with conventional parts, e.g., tangential spokes 24 and a conventional rim 26. Accordingly, when the rear wheel 14 is assembled, the spokes 24 extend tangentially from an imaginary circle centered on the center axis of rotation of rear hub 22. In the illustrated embodiment of FIGS. 2–5, the rear hub 22 and the rim 26 has thirty-six of the spokes 24 coupled therebetween.

The term "tangential spokes" are spokes that have a straight section 24a and a bent end 24b with an enlarged head 24c such that straight section 24a extends at an angle of about 95° relative to the bent end 24b. Such spokes are well known in the bicycle art. As seen in FIG. 3, the spokes 24 of the illustrated embodiment each have an outer threaded end 24d that is located at the opposite end of the center straight section 24a from the bent end 24b (inner end portion) with the enlarged head 24c. The bent end 24b has a center axis that forms an angle of about 95° with the center axis of the straight section 24a. The bent ends 24b of the spokes 24 are designed to be received within the first and second spoke openings. In particular, the enlarged heads 24c of the spokes 24 engage an interior surface of the hub body 38 with the straight sections 24a extending substantially tangentially to an imaginary circle with a center on the center axis of rotation of the rear hub 22.

The rim 26 can be any conventional rim that has a plurality of spoke holes 34 for receiving the spoke nipples 28 for attaching the outer threaded ends 24d of the spokes 24 thereto. In the illustrated embodiment, the rim 26 is a conventional steel or alloy rim having a U-shaped cross section with thirty-six spoke holes 34. The spoke holes 34 are equally spaced apart in a circumferential direction. The spoke holes 34 are preferably lie in a single plane P that divides the cross section in half as seen in FIG. 3. Of course, rims with fewer or more spoke holes 34 can be used with a hub of the present invention, if needed and/or desired. For example, the rim 26 can have thirty-two spoke holes instead of thirty-six spoke holes, if the rear hub 22 is modified to have fewer holes as explained below.

Rear Hub 22

Figure 5:
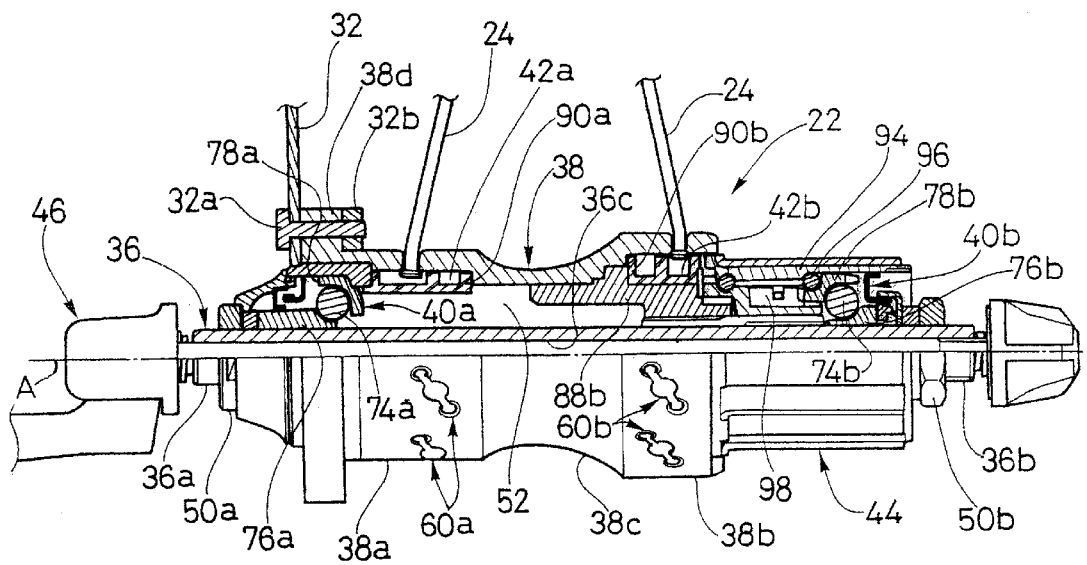
FIG. 5 is a side elevational view of the rear brake disc hub of the rear wheel illustrated in FIG. 3 with certain portions broken away for purposes of illustration.
Figure 6:
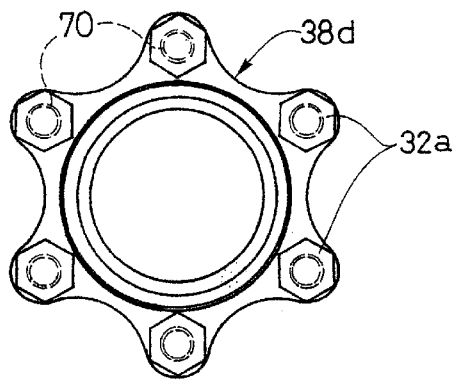
FIG. 6 is a left end elevational view of the rear brake disc hub body illustrated in FIGS. 4 and 5 with the brake disc rotor bolts mounted thereto.

As best seen in FIG. 5, the rear hub 22 basically includes a hub axle 36, a hub body or shell 38, a first bearing assembly 40a, a second bearing assembly 40b, a first spoke seal 42a, a second spoke seal 42b, a freewheel 44 and a quick release mechanism 46. Of the parts of rear hub 22, only the hub body 38 and the first and second spoke seals 42a and 42b are non-conventional parts. The remaining parts of rear hub 22 are relatively conventional, and thus, the remaining parts of rear hub 22 will not be discussed or illustrated in detail herein.

The hub axle 36 has a center axis A extending between a first end 36a and a second end 36b. The quick release mechanism 46 extends through a center bore 36c of the hub axle 36 such that the quick release mechanism 46 is coupled to the hub axle 36 in a conventional manner. The first and second ends 36a and 36b of the hub axle 36 are threaded for receiving a pair of nuts 50a and 50b that applies an axial force on the hub body 38, the bearing assemblies 40a and 40b, the spoke seals 42a and 42b, and the freewheel 44. First and second bearing assemblies 40a and 40b rotatably mount the hub body 38 with the freewheel 44 on the hub axle 36. The freewheel 44 allows the hub axle 36 to rotate freely relative to the hub body 38 in one direction, but fixedly couples the hub axle 36 relative to the hub body 38 in the opposite rotational direction.

The hub body 38 is illustrated in accordance with one embodiment of the present invention. In this embodiment, the hub body 38 is a hollow member that defines an interior passageway 52 with the hub axle 36 being rotatably supported therein by the first and second bearing assemblies 40a and 40b. Thus, the hub body 38 is a substantially tubular member. Specifically, the hub body 38 has a center tubular portion 38c with first and second end sections 38a and 38b being integral formed with the center tubular portion 38c as a one-piece, unitary member. The first end section 38a has an integrally mounted brake rotor attachment portion 38d, while a second end section 38b has the freewheel 44 fixedly coupled thereto.

A set of first spoke openings 60a are provided at the first end section 38a of the hub body 38 for receiving the bent ends 24b of the spokes 24. Similarly, the second end section 38b of the hub body 38 is provided with a second set of spoke openings 60b for receiving the bent ends 24b of the spokes 24. In the illustrated embodiment, the first end section 38a is provided with nine of the first spoke openings 60a and the second end section 38b is provided with nine of the second spoke openings 60b. The spoke openings 60a and 60b are equally spaced apart about the circumference of the hub body 38. Each of the spoke openings 60a and 60b are also designed to receive two spokes 24 as explained below. Accordingly, the rear hub 22 is designed to have thirty-six spokes extending outwardly therefrom in a generally tangential direction.

Preferably, the first and second sets of spoke openings 60a and 60b are identical. The first and second spoke openings 60a and 60b are designed to be used with conventional tangential spokes 24. Of course, it is possible that the first and second sets of spoke openings 60a and 60b can be different such that tangential spokes 24 are used in one end of the hub body 38 and a different types of spokes are used in the other end of the hub body 38. The first spoke openings 60a are circumferentially arranged around the hub body 38 adjacent to the brake rotor attachment portion 38d. Preferably, the first spoke openings 60a are spaced axially inward of the brake rotor attachment portion 38d so that brake disc rotor 32 can be easily attached with the bolts 32a and nuts 32b.

In this embodiment, the first and second spoke openings 60a and 60b are elongated slots that are each provided with an insertion portion 61 and a pair of retaining portions 62. Accordingly, each of the spoke openings 60a and 60b is designed to have a pair of spokes 24 retained therein with the spokes 24 extending in opposite directions.

The insertion portion 61 of each spoke opening is located between the pair of retaining portions 62 of each spoke opening. Each insertion portion 61 is formed by a pair of opposed curved surfaces 64 that are spaced apart so as to be equal to or slightly larger than the widths or diameters of the enlarged heads 24c of the spokes 24. Thus, the inner ends (bent ends 24b with enlarged heads 24c) of the spokes 24 can be easily inserted into the spoke openings 60a and 60b through the insertion portions 61.

The retaining portions 62 have smaller widths or diameters than the insertion portions 61. More specifically, the diameters or widths of the retaining portions 62 are smaller than the diameters or widths of the enlarged heads 24c of the spokes 24 so as to retain the spokes 24 within the spoke openings 60a and 60b. The retaining portions 62 are each preferably defined by a partial cylindrical surface 66 that is connected to the curved surfaces 64 of the associated insertion portion 61 by a pair of straight surfaces 68.

The spoke openings 60a and 60b are formed as elongated slots that are angled relative to the axis A. Accordingly, the insertion portions 61 are arranged in a circumferential pattern with one set of the retaining portions 62 being located axially outward from the insertion portions 61 and the other set of retaining portions 62 being spaced axially inward from the insertion portions 61. In other words, a first set of retaining portions 62 form an outer circumferential row of the retaining portions 62, and a second set of the retaining portions 62 form an inner circumferential row of retaining portions 62 with the insertion portions 61 being located between the rows of retaining portions 62.

Preferably, the insertion portion 61 and the retaining portions 62 of each spoke opening are formed simultaneously. Also preferably, the inner and outer ends of the retaining portions 62 of the spoke openings 60a and 60b are tapered to avoid sharp edges engaging the spokes 24.

Each of the insertion portions 61 has a center longitudinal axis $C_1$ that passes through the center axis A of the hub axle 36. The retaining portions 62, on the other hand, have center longitudinal axes $C_2$ that are parallel to the center longitudinal axis $C_1$ of the insertion portion 61 for each of the spoke openings 60a and 60b. Thus, the center longitudinal axes $C_2$ of the retaining portions 62 do not pass through the center axis of the hub axle 36. Rather, the center longitudinal axes $C_2$ of the retaining portions 62 are angled with respect to center axis A. Preferably, the center longitudinal axis $C_2$ of each retaining portion 62 is angled between about 5° and about 20° from a radial orientation in the hub body 38. In the illustrated embodiment, the retaining portions 62 are angled about 10° with respect to center axis A for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 62 are preferably angled about 11° with respect to center axis A. This angled configuration of the retaining portions 62 results in the straight sections 24a of the spokes 24 being easily arranged in a tangential direction relative to an imaginary circle centered on the hub body 38. Moreover, this angled configuration of the retaining portions 62 allows the straight sections 24a of the spokes 24 to be easily aligned with the spoke holes 34 of the rim 26 without significant bending of the spokes 24. In the illustrated embodiment, the spokes 24 are not bent more than about five degrees. Of course, the less bending of the spokes 24, the better.

If the retaining portions 62 were formed with their center axis passing through the center axis A of the hub axle 36, then the conventional spokes 24 would be placed under excessive bending forces, which could result in the spokes 24 breaking during use of the wheel. In particular, if the retaining portions 62 have their center axes passing through the center of the hub axle 36, then the center straight section 24a would have to be bent from 95° to 108° for a twenty-six inch rim with thirty-six spoke holes and a hub having a diameter approximately 22 millimeters. In contrast, with the retaining portions 62 of the spokes 24 being angled, the amount of bending of the spokes 24 can be reduced and/or eliminated.

The brake rotor attachment portion 38d is integrally formed with the center tubular portion 38c of the hub body 38 as a one-piece, unitary member. In the illustrated embodiment, the brake rotor attachment portion 38d is formed with six attachment members or points with through bores 70. While six individual attachment points are illustrated, it will be apparent to those skilled in the art from this disclosure that fewer or more attachment points can be utilized. Moreover, it will be apparent to those skilled in the art from this disclosure that the attachment portions could be a continuous flange, if needed and/or desired. The through bore 70 can be threaded (FIG. 7) or unthreaded (bores 70' of FIG. 8). By using through bores 70 instead of blind bores, the rear hub 22 can be easily manufactured at a relatively lower cost.

Figure 8:
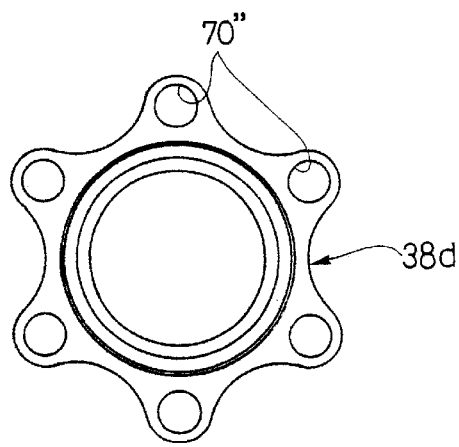
FIG. 8 is a left end elevational view of the rear brake disc hub body illustrated in FIGS. 4 and 5 with unthreaded bolt holes.

As seen in FIG. 8, the through bores 70" can be unthreaded bores. In the case of unthreaded through bores 70", the bolts 32a extend into openings in the brake disc rotor 32 and then through the through bores 70". The free ends of the bolts 32a have nuts 32b threaded thereon for attaching the brake disc rotor 32 to the hub body 38. This arrangement allows the hub body 38 and the brake rotor attachment portion 38d to be formed out of the same a lightweight material, such as aluminum. In this arrangement, the hub body 38 does not need to be replaced if the through bores 70" become damaged.

Figure 7:
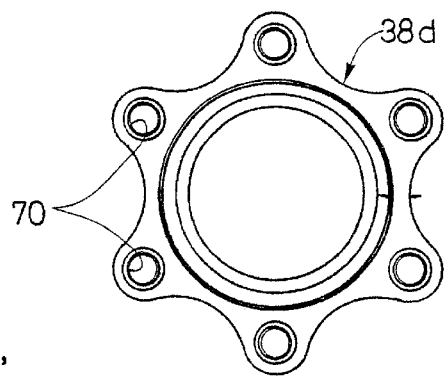
FIG. 7 is a left end elevational view of the rear brake disc hub body illustrated in FIGS. 4 and 5 with the brake disc rotor bolts removed.

As seen in FIG. 7, the through bores 70 are threaded. In the case of threaded through bores 70, the bolts 32a extend into openings in the brake disc rotor 32 and then threaded into the through bores 70. Optionally, the free ends of the bolts 32a can have the nuts 32b threaded thereon for more securely attaching the brake disc rotor 32 to the hub body 38. In this arrangement, if the threads of through bores 70 become damaged, the hub body 38 does not need to be replaced. Rather, the bolts 32a and the nuts 32b securely attach the brake disc rotor 32 to the hub body 38.

Bearing assemblies 40a and 40b rotatably supports hub body 38 on hub axle 36. The bearing assembly 40a basically includes a plurality of balls 74a located between an inner race member 76a and an outer race member 78a. Similarly, the bearing assembly 40b basically includes a plurality of balls 74b located between an inner race member 76b and an outer race member 78b. Since bearing assemblies 40a and 40b are well known in the bicycle art, they will not be discussed or illustrated in detail herein.

Figure 13:
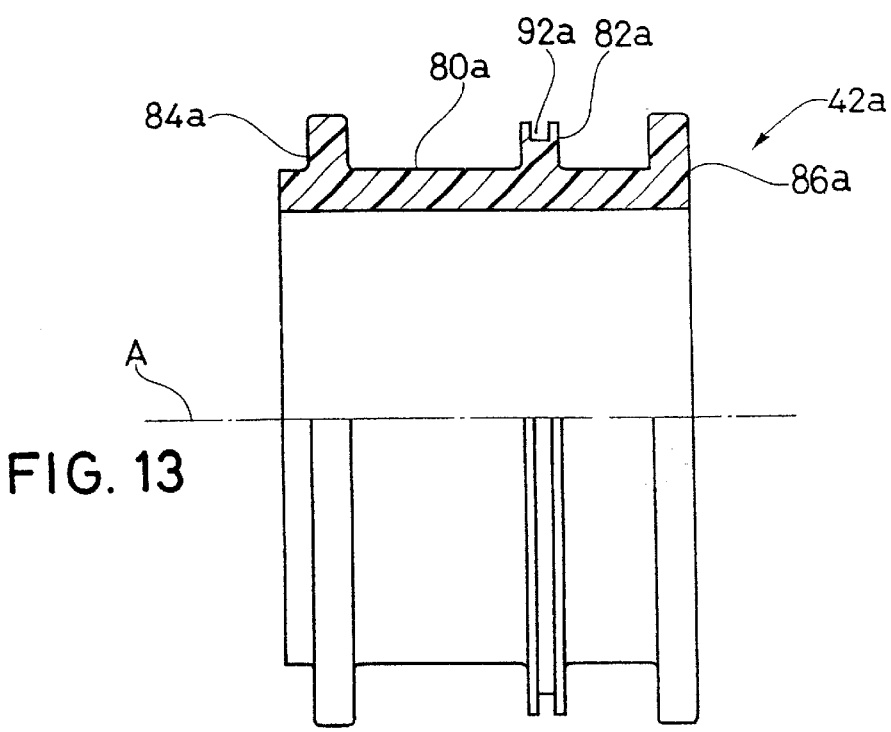
FIG. 13 is a partial cross-sectional view of the first seal for the rear brake disc hub body illustrated in FIGS. 4 and 5.
Figure 14:
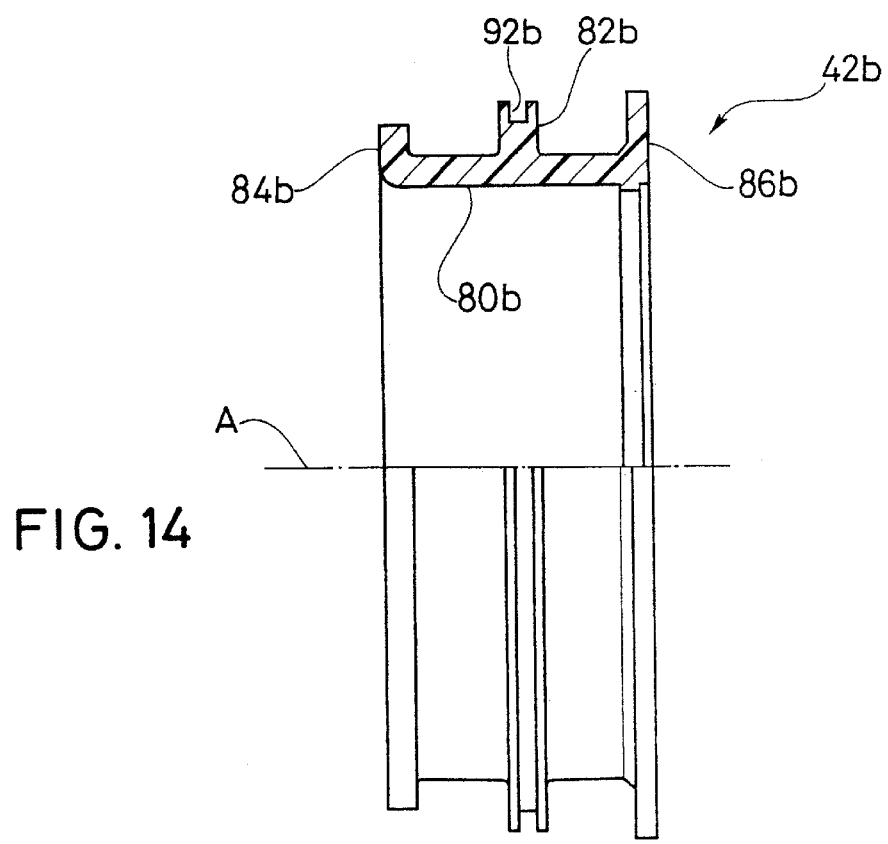
FIG. 14 is a partial cross-sectional view of the second seal for the rear brake disc hub body illustrated in FIGS. 4 and 5.

Turning now to FIGS. 13 and 14, the spoke seals 42a and 42b are arranged in the interior passageway 52 of the hub body 38 so as to be adjacent the spoke openings 60a and 60b to isolate the spoke openings 60a and 60b from the hub axle 36. In other words, the spoke seals 42a and 42b prevent contaminants from entering the rear hub 22 through the spoke openings 60a and 60b. The spoke seals 42a and 42b are preferably resilient members that are constructed of rubber or the like. Of course, it will be apparent to those skilled in the art from this disclosure that the seals could be created from other types of materials, depending upon their shape and arrangement. Moreover, it will be apparent to those skilled in the art from this disclosure that while the spoke seals 42a and 42b are illustrated as a pair of separate sealing members, the spoke seals 42a and 42b can be formed as a one-piece, unitary member.

In the preferred embodiment, the spoke seals 42a and 42b also aid in the assembly of the spokes 24 with the hub body 38 and the rim 26. Specifically, in the preferred embodiments, the seals 42a and 42b are arranged so that they restrain movement of the spokes 24 within the spoke openings 60a and 60b so that the bent ends 24b of the spokes 24 stays in the retaining portions 62 of the spoke openings 60a and 60b.

In the illustrated embodiment, the spoke seal 42a has a tubular section 80a and a center annular flange 82a. The center annular flange 82a extends in a circumferential direction about the tubular section 80a. The center annular flange 82a can either contact the interior surface of the tubular section 80a or be spaced from the tubular section 80a. The ends 84a and 86a of the tubular section 80a are configured to engage a ring member 88a and an abutment 90a of the inner surface of the hub body 38. Of course, the particular shape of the ends 84a and 86a will vary depending on the shape of the hub body 38 and its internal components. Preferably, ends 84a and 86a of the tubular section 80a are annular flanges that contact the interior surface of the tubular section 80a to form an isolated area beneath the spoke openings 60a. This isolated area beneath the spoke openings 60a is a continuous annular space.

When the rear hub 22 is assembled, an axial force is applied to the ends 84a and 86a of the tubular section 80a to form annular seals therebetween. Accordingly, the spoke seal 42a isolates a first interior section of the interior passageway 52 from the remainder of the interior passageway 52. This interior section formed by the spoke seal 42a is continuous annular first space located beneath the spoke openings 60a.

The center annular flange 82a is preferably aligned with a radial plane passing through the centers axes $C_1$ of the insertion portions 61 of the first spoke openings 60a. Thus, the center annular flange 82a is positioned to axially separate the two retaining portions 62 of each of the first spoke openings 60a from each other. The center annular flange 82a is also positioned to keep spokes 24 in the retaining portions 62 of the first spoke openings 60a. Accordingly, when the enlarged heads 24c of the spokes 24 are inserted into the insertion portions 61 of the spoke openings 60a, the enlarged heads 24c of the spokes 24 contact the center annular flange 82a. The enlarged heads 24c then pushes or deforms the center annular flange 82a one way or the other so that the enlarged heads 24c extends into the insertion portions 61 of the spoke openings 60a. The spokes 24 are then moved or slid into one of the two retaining portions 62 of each of the spoke openings 60a. The center annular flange 82a will prevent the spokes 24 from accidentally falling out of the insertion portions 61 of the spoke openings 60a. Thus, the center annular flange 82a aids in the assembly of the rear wheel 14. In other words, the center annular flange 82a must be moved or deformed again before the spokes 24 can be removed from the spoke openings 60a. For added resiliency, an annular groove 92a can be formed in the outer peripheral surface of the center flange 82a.

Similar to the spoke seal 42a, the spoke seal 42b has a tubular section 80b and a center annular flange 82b. The center annular flange 82a extends in a circumferential direction about the tubular section 80a. Alternatively, the center annular flanges 82a and 82b of the spoke seals 42a and 42b can each have a pair of center annular flanges. The ends 84b and 86b of the tubular section 80b are configured to engage a ring member 88b and an abutment 90b of the inner surface of the hub body 38. Of course, the particular shape of the ends 84b and 86b will vary depending on the shape of the hub body 38 and its internal components. Preferably, ends 84b and 86b of the tubular section 80b are annular flanges that contact the interior surface of the tubular section 80b to form an isolated area beneath the spoke openings 60b. This isolated area beneath the spoke openings 60b is a continuous annular space.

When the rear hub 22 is assembled, an axial force is applied to the ends 84b and 86b of the tubular section 80b to form annular seals therebetween. Accordingly, the spoke seal 42b isolates a second interior section of the interior passageway 52 from the remainder of the interior passageway 52. This interior section formed by the spoke seal 42b is continuous annular second space located beneath the spoke openings 60b.

Similar to the center annular flange 82a, the center annular flange 82b is preferably aligned with a radial plane passing through the centers axes $C_1$ of the insertion portions 61 of the second spoke openings 60b. Thus, the center annular flange 82b is positioned to axially separate the two retaining portions 62 of each of the second spoke openings 60b from each other. The center annular flange 82b is also positioned to keep spokes 24 in the retaining portions 62 of the second spoke openings 60b. Accordingly, when the enlarged heads 24c of the spokes 24 are inserted into the insertion portions 61 of the spoke openings 60b, the enlarged heads 24c of the spokes 24 contact the center annular flange 82b. The enlarged heads 24c then pushes or deforms the center annular flange 82b one way or the other so that the enlarged heads 24c extends into the insertion portions 61 of the spoke openings 60b. The spokes 24 are then moved or slid into one of the two retaining portions 62 of each of the spoke openings 60b. The center annular flange 82b will prevent the spokes 24 from accidentally falling out of the insertion portions 61 of the spoke openings 60b. Thus, the center annular flange 82b aids in the assembly of the rear wheel 14. In other words, the center annular flange 82b must be moved or deformed again before the spokes 24 can be removed from the spoke openings 60b. For added resiliency, an annular groove 92b can be formed in the outer peripheral surface of the center flange 82b.

The freewheels, such as the freewheel 44, are well known in the bicycle art, and thus, the freewheel 44 will not be illustrated or discussed in detail herein. The freewheel 44 is used to transmit a driving force from the chain to the rear bicycle wheel in one rotation direction only. The freewheel 44 allows the bicycle 10 to advance freely without any rotation of the pedals. The freewheel 44 is fastened to the rear hub 22 as integral part of the rear hub 22 in a conventional manner. The freewheel 44 has an outer tubular part 94, an inner tubular part 96 and a one-way clutch 98. The inner tubular part 96 is installed radially inwardly of the outer tubular part 94 so that the inner tubular part 96 is free to rotate relative to the outer tubular part 94. The one-way clutch 98 is installed between the outer tubular part 94 and inner tubular part 96 for transmitting the driving force from the outer tubular part 94 to the inner tubular part 96 in one rotational direction only. The outer tubular part 94 has a plurality of gears or sprockets (not shown) mounted thereon, while the inner tubular part 96 is usually mounted on the hub axle 36.

Front Hub 22'

Figure 15:
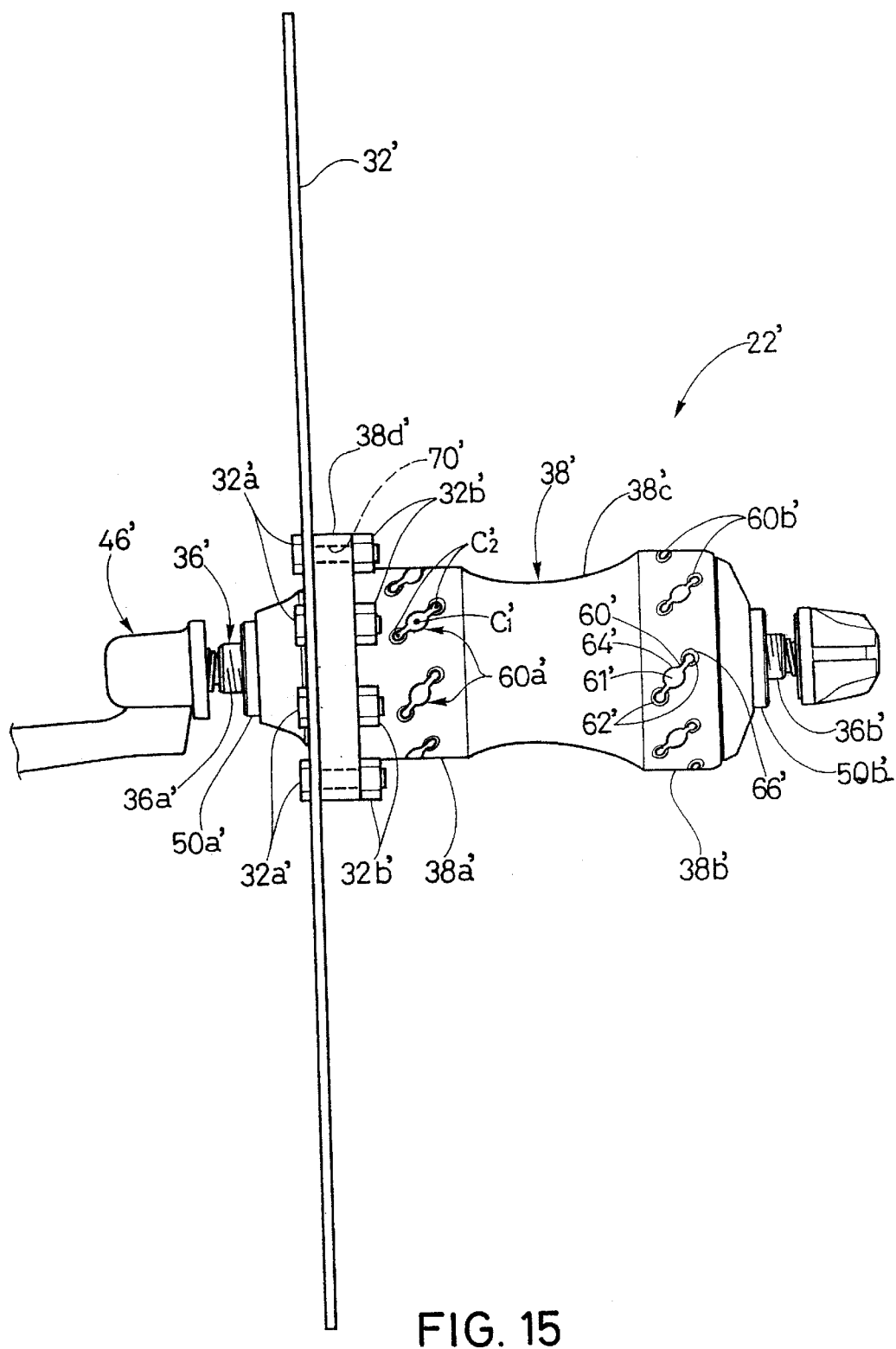
FIG. 15 is a side elevational view of the front brake disc hub of the front wheel illustrated in FIG. 1.
Figure 16:
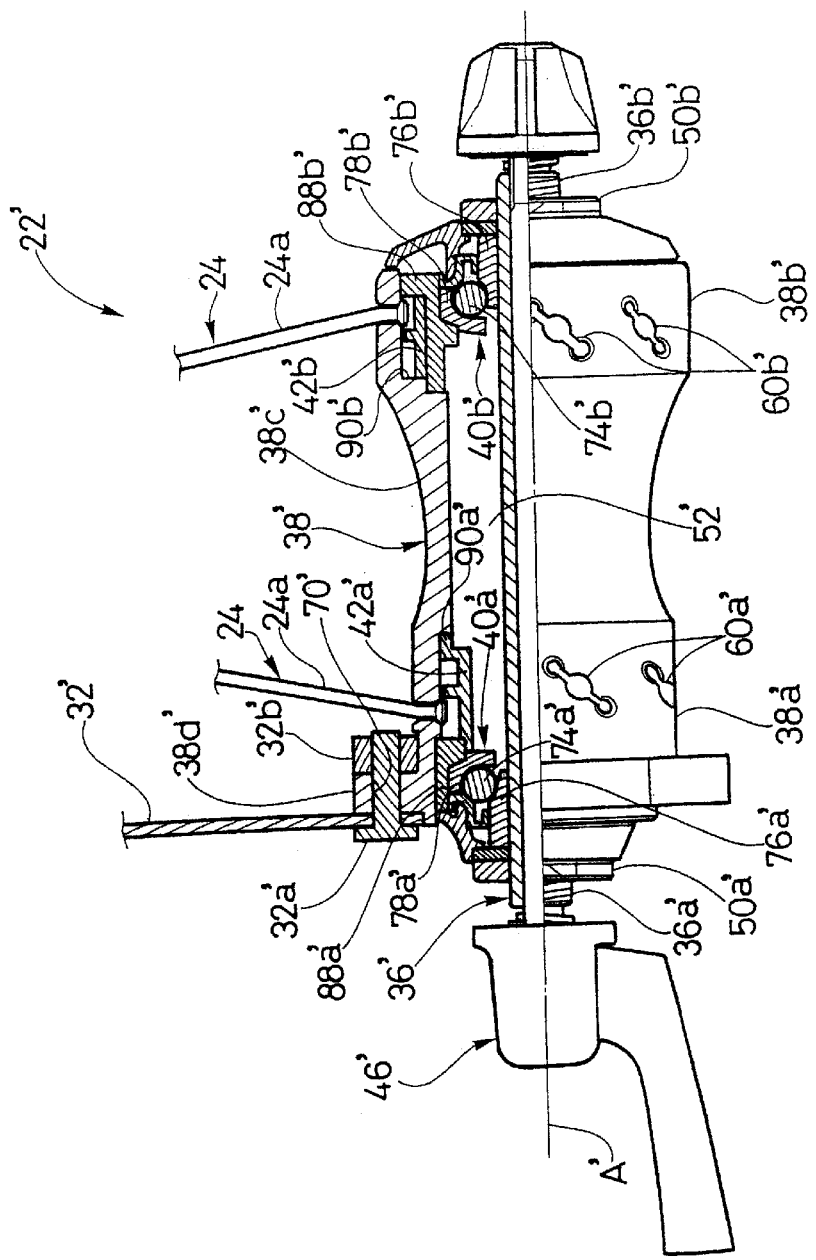
FIG. 16 is a side elevational view of the front brake disc hub of the front wheel illustrated in FIG. 1 with certain portions broken away for purposes of illustration.

Turning now to FIGS. 15 and 16, the front hub 22' is illustrated in accordance with the present invention. The front hub 22' is substantially the same as the rear hub 22, except that the front hub 22' does not have a freewheel and the spoke openings 60a' and 60b' are angled in the opposite direction from spoke openings 60a and 60b of the rear hub 22. Moreover, the front hub 22' is used with spokes 24 and rim 26 discussed above. Since the front hub 22' is substantially the same as the rear hub 22, the front hub 22' will not be discussed or illustrated in detail herein.

The front hub 22' basically includes a hub axle 36', a hub body or shell 38', a first bearing assembly 40a', a second bearing assembly 40b', a first spoke seal 42a', a second spoke seal 42b' and a quick release mechanism 46'. Of the parts of front hub 22', only the hub body 38' and the first and second spoke seals 42a' and 42b' are non-conventional parts. The remaining parts of front hub 22' are relatively conventional, and thus, the remaining parts of front hub 22' will not be discussed or illustrated in detail herein.

The hub axle 36' has a center axis A extending between a first end 36a' and a second end 36b'. The quick release mechanism 46' extends through a center bore 36c' of the hub axle 36' such that the quick release mechanism 46' is coupled to the hub axle 36' in a conventional manner. The first and second ends 36a' and 36b' of the hub axle 36' are threaded for receiving a pair of nuts 50a' and 50b' that applies an axial force on the hub body 38', the bearing assemblies 40a' and 40b' and the spoke seals 42a' and 42b'. First and second bearing assemblies 40a' and 40b' rotatably mount the hub body 38' on the hub axle 36'.

The hub body 38' is illustrated in accordance with one embodiment of the present invention. In this embodiment, the hub body 38' is a hollow member that defines an interior passageway 52' with the hub axle 36' being rotatably supported therein by the first and second bearing assemblies 40a' and 40b'. Thus, the hub body 38' is a substantially tubular member. Specifically, the hub body 38' has a center tubular portion 38c' with first and second end sections 38a' and 38b' being integral formed with the center tubular portion 38c' as a one-piece, unitary member. The first end section 38a' has an integrally mounted brake rotor attachment portion 38d'.

A set of first spoke openings 60a' are provided at the first end section 38a' of the hub body 38' for receiving the bent ends 24b of the spokes 24. Similarly, the second end section 38b' of the hub body 38' is provided with a second set of spoke openings 60b' for receiving the bent ends 24b of the spokes 24. In the illustrated embodiment, the first end section 38a' is provided with nine of the first spoke openings 60a' and the second end section 38b' is provided with nine of the second spoke openings 60b'. The spoke openings 60a' and 60b' are equally spaced apart about the circumference of the hub body 38'. Each of the spoke openings 60a' and 60b' are also designed to receive two spokes 24 as explained below. Accordingly, the front hub 22' is designed to have thirty-six spokes extending outwardly therefrom in a generally tangential direction.

Preferably, the first and second sets of spoke openings 60a' and 60b' are identical. The first and second spoke openings 60a' and 60b' are designed to be used with conventional tangential spokes 24. Of course, it is possible that the first and second sets of spoke openings 60a' and 60b' can be different such that tangential spokes 24 are used in one end of the hub body 38' and a different types of spokes are used in the other end of the hub body 38'. The first spoke openings 60a' are circumferentially arranged around the hub body 38' adjacent to the brake rotor attachment portion 38d'. Preferably, the first spoke openings 60a' are spaced axially inward of the brake rotor attachment portion 38d' so that brake disc rotor 32' can be easily attached with the bolts 32a' and nuts 32b'.

In this embodiment, the first and second spoke openings 60a' and 60b' are elongated slots that are each provided with an insertion portion 61' and a pair of retaining portions 62'. Accordingly, each of the spoke openings 60a' and 60b' is designed to have a pair of spokes 24 retained therein with the spokes 24 extending in opposite directions.

The insertion portion 61' of each spoke opening is located between the pair of retaining portions 62' of each spoke opening. Each insertion portion 61' is formed by a pair of opposed curved surfaces 64' that are spaced apart so as to be equal to or slightly larger than the widths or diameters of the enlarged heads 24c of the spokes 24. Thus, the inner ends (bent ends 24b with enlarged heads 24c) of the spokes 24 can be easily inserted into the spoke openings 60a' and 60b' through the insertion portions 61'.

The retaining portions 62' have smaller widths or diameters than the insertion portions 61'. More specifically, the diameters or widths of the retaining portions 62' are smaller than the diameters or widths of the enlarged heads 24c of the spokes 24 so as to retain the spokes 24 within the spoke openings 60a' and 60b'. The retaining portions 62' are each preferably defined by a partial cylindrical surface 66' that is connected to the curved surfaces 64' of the associated insertion portion 61' by a pair of straight surfaces 68'.

The spoke openings 60a' and 60b' are formed elongated slots that are angled relative to the axis A'. Accordingly, the insertion portions 61' are arranged in a circumferential pattern with one set of the retaining portions 62' being located axially outward from the insertion portions 61' and the other set of retaining portions 62' being spaced axially inward from the insertion portions 61'. In other words, a first set of retaining portions 62' form an outer circumferential row of the retaining portions 62', and a second set of the retaining portions 62' form an inner circumferential row of retaining portions 62' with the insertion portions 61' being located between the rows of retaining portions 62'.

Preferably, the insertion portion 61' and the retaining portions 62' of each spoke opening are formed simultaneously. Also preferably, the inner and outer ends of the retaining portions 62' of the spoke openings 60a' and 60b' are tapered to avoid sharp edges engaging the spokes 24.

Each of the insertion portions 61' has a center longitudinal axis $C_1'$ that passes through the center axis A' of the hub axle 36'. The retaining portions 62', on the other hand, have center longitudinal axes $C_2'$ that are parallel to the center longitudinal axis $C_1'$ of the insertion portion 61' for each of the spoke openings 60a' and 60b'. Thus, the center longitudinal axes $C_2'$ of the retaining portions 62' do not pass through the center axis of the hub axle 36'. Rather, the center longitudinal axes $C_2'$ of the retaining portions 62' are angled with respect to center axis A'. Preferably, the center longitudinal axis $C_2'$ of each retaining portion 62' is angled between about 5° and about 20° from a radial orientation in the hub body 38'. In the illustrated embodiment, the retaining portions 62' are angled about 10° with respect to center axis A for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 62' are preferably angled about 11° with respect to center axis A'. This angled configuration of the retaining portions 62' results in the straight sections 24a of the spokes 24 being easily arranged in a tangential direction relative to an imaginary circle centered on the hub body 38'. Moreover, this angled configuration of the retaining portions 62' allows the straight sections 24a of the spokes 24 to be easily aligned with the spoke holes 34 of the rim 26 without significant bending of the spokes 24. In the illustrated embodiment, the spokes 24 are not bent more than about five degrees.

If the retaining portions 62' were formed with their center axis passing through the center axis A of the hub axle 36', then the conventional spokes 24 would be placed under excessive bending forces, which could result in the spokes 24 breaking during use of the wheel. In particular, if the retaining portions 62' have their center axes passing through the center of the hub axle 36', then the center straight section 24a would have to be bent from 95° to 108° for a twenty-six inch rim with thirty-six spoke holes and a hub having a diameter approximately 22 millimeters. In contrast, with the retaining portions 62' of the spokes 24 being angled, the amount of bending of the spokes 24 can be reduced and/or eliminated.

The brake rotor attachment portion 38d' is integrally formed with the center tubular portion 38c' of the hub body 38' as a one-piece, unitary member. In the illustrated embodiment, the brake rotor attachment portion 38d' is formed with six attachment members or points with through bores 70'. While six individual attachment points are illustrated, it will be apparent to those skilled in the art from this disclosure that fewer or more attachment points can be utilized. Moreover, it will be apparent to those skilled in the art from this disclosure that the attachment portions could be a continuous flange, if needed and/or desired. The through bore 70' can be threaded or unthreaded. By using through bores 70' instead of blind bores, the front hub 22' can be easily manufactured at a relatively lower cost.

In the case of unthreaded through bores 70', the bolts 32a' extend into openings in the brake disc rotor 32' and then through the through bores 70'. The free ends of the bolts 32a' have nuts 32b' threaded thereon for attaching the brake disc rotor 32' to the hub body 38'. This arrangement allows the hub body 38' and the brake rotor attachment portion 38d' to be formed out of the same a lightweight material, such as aluminum. Moreover, the hub body 38' does not need to be replaced if the through bores 70' become damaged.

In the case of threaded through bores 70', the bolts 32a' extend into openings in the brake disc rotor 32' and then threaded into the through bores 70'. Optionally, the free ends of the bolts 32a' can have the nuts 32b' threaded thereon for more securely attaching the brake disc rotor 32' to the hub body 38'. In this arrangement, if the threads of through bores 70' become damaged, the hub body 38' does not need to be replaced. Rather, the bolts 32a' and the nuts 32b' securely attach the brake disc rotor 32' to the hub body 38'.

Bearing assemblies 40a' and 40b' rotatably supports hub body 38' on hub axle 36'. The bearing assembly 40a' basically includes a plurality of balls 74a' located between an inner race member 76a' and an outer race member 78a'. Similarly, the bearing assembly 40b' basically includes a plurality of balls 74b' located between an inner race member 76b' and an outer race member 78b'. Since bearing assemblies 40a' and 40b' are well known in the bicycle art, they will not be discussed or illustrated in detail herein.

Figure 17:
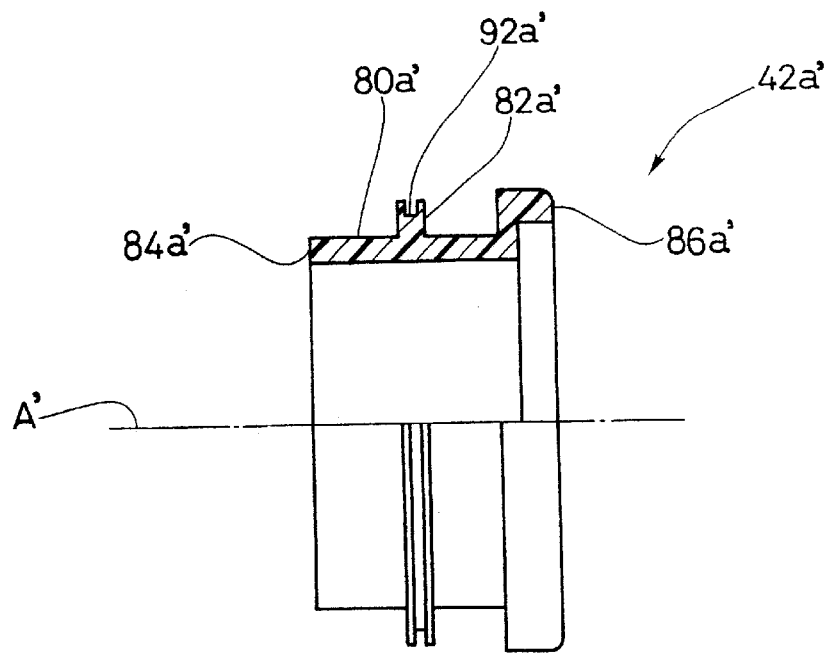
FIG. 17 is a partial cross-sectional view of the first seal for the front brake disc hub body illustrated in FIGS. 15 and 16.
Figure 18:
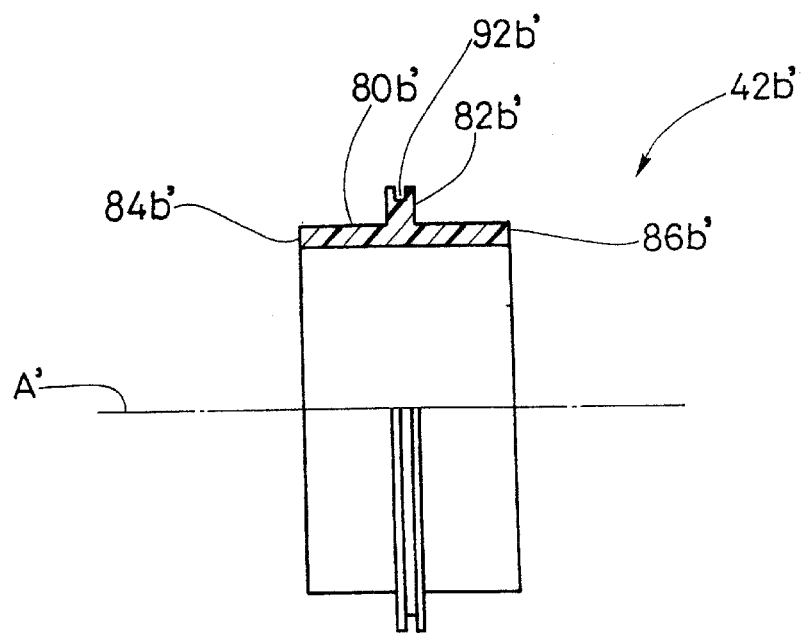
FIG. 18 is a partial cross-sectional view of the second seal for the front brake disc hub body illustrated in FIGS. 15 and 16.

Turning now to FIGS. 17 and 18, the spoke seals 42a' and 42b' are arranged in the interior passageway 52' of the hub body 38' so as to be adjacent the spoke openings 60a' and 60b' to isolate the spoke openings 60a' and 60b' from the hub axle 36. In other words, the spoke seals 42a' and 42b' prevent contaminants from entering the front hub 22' through the spoke openings 60a' and 60b'. The spoke seals 42a' and 42b' are preferably resilient members that are constructed of rubber or the like. Of course, it will be apparent to those skilled in the art from this disclosure that the seals could be created from other types of materials, depending upon their shape and arrangement. Moreover, it will be apparent to those skilled in the art from this disclosure that while the spoke seals 42a' and 42b' are illustrated as a pair of separate sealing members, the spoke seals 42a' and 42b' can be formed as a one-piece, unitary member.

In the preferred embodiment, the spoke seals 42a' and 42b' also aid in the assembly of the spokes 24 with the hub body 38' and the rim 26. Specifically, in the preferred embodiments, the seals 42a' and 42b' are arranged so that they restrain movement of the spokes 24 within the spoke openings 60a' and 60b' so that the bent ends 24b of the spokes 24 stays in the retaining portions 62' of the spoke openings 60a' and 60b'.

In the illustrated embodiment, the spoke seal 42a' has a tubular section 80a' and a center annular flange 82a'. The center annular flange 82a' extends in a circumferential direction about the tubular section 80a'. The ends 84a' and 86a' of the tubular section 80a' are configured to engage a ring member 88a' and an abutment 90a' of the inner surface of the hub body 38'. Of course, the particular shape of the ends 84a' and 86a' will vary depending on the shape of the hub body 38' and its internal components. In other words, the spoke seal 42a' functions the same way as the spoke seal 42a of the rear hub 22, but has a slightly modified ends 84a' and 86a' to accommodate front hub 22'.

When the front hub 22' is assembled, an axial force is applied to the ends 84a' and 86a' of the tubular section 80a' to form annular seals therebetween. Accordingly, the spoke seal 42a' isolates a first interior section of the interior passageway 52' from the remainder of the interior passageway 52'. This interior section formed by the spoke seal 42a' is continuous annular first space located beneath the spoke openings 60a'.

The center annular flange 82a' is preferably aligned with a radial plane passing through the centers axes $C_1'$ of the insertion portions 61' of the first spoke openings 60a'. Thus, the center annular flange 82a' is positioned to axially separate the two retaining portions 62' of each of the first spoke openings 60a' from each other. The center annular flange 82a' is also positioned to keep spokes 24 in the retaining portions 62' of the first spoke openings 60a'. Accordingly, when the enlarged heads 24c of the spokes 24 are inserted into the insertion portions 61' of the spoke openings 60a', the enlarged heads 24c of the spokes 24 contact the center annular flange 82a'. The enlarged heads 24c then pushes or deforms the center annular flange 82a' one way or the other so that the enlarged heads 24c extends into the insertion portions 61' of the spoke openings 60a'. The spokes 24 are then moved or slid into one of the two retaining portions 62' of each of the spoke openings 60a. The center annular flange 82a' will prevent the spokes 24 from accidentally falling out of the insertion portions 61' of the spoke openings 60a'. Thus, the center annular flange 82a' aids in the assembly of the front wheel 16. In other words, the center annular flange 82a' must be moved or deformed again before the spokes 24 can be removed from the spoke openings 60a'. For added resiliency, an annular groove 92a' can be formed in the outer peripheral surface of the center flange 82a'.

Similar to the spoke seal 42a', the spoke seal 42b' has a tubular section 80b' and a center annular flange 82b'. The center annular flange 82a' extends in a circumferential direction about the tubular section 80a'. Alternatively, the center annular flanges 82a' and 82b' of the spoke seals 42a' and 42b' can each have a pair of center annular flanges. The ends 84b' and 86b' of the tubular section 80b' are configured to engage a ring member 88b' and an abutment 90b' of the inner surface of the hub body 38'. Of course, the particular shape of the ends 84b' and 86b' will vary depending on the shape of the hub body 38' and its internal components. When the front hub 22' is assembled, an axial force is applied to the ends 84b' and 86b' of the tubular section 80b' to form annular seals therebetween. Accordingly, the spoke seal 42b' isolates a second interior section of the interior passageway 52' from the remainder of the interior passageway 5'. This interior section formed by the spoke seal 42b' is continuous annular second space located beneath the spoke openings 60b'.

Similar to the center annular flange 82a', the center annular flange 82b' is preferably aligned with a radial plane passing through the centers axes $C_1$ of the insertion portions 61' of the second spoke openings 60b'. Thus, the center annular flange 82b' is positioned to axially separate the two retaining portions 62' of each of the second spoke openings 60b' from each other. The center annular flange 82b' is also positioned to keep spokes 24 in the retaining portions 62' of the second spoke openings 60b'. Accordingly, when the enlarged heads 24c of the spokes 24 are inserted into the insertion portions 61' of the spoke openings 60b', the enlarged heads 24c of the spokes 24 contact the center annular flange 82b'. The enlarged heads 24c then pushes or deforms the center annular flange 82b' one way or the other so that the enlarged heads 24c extends into the insertion portions 61' of the spoke openings 60b'. The spokes 24 are then moved or slid into one of the two retaining portions 62 of each of the spoke openings 60b'. The center annular flange 82b' will prevent the spokes 24 from accidentally falling out of the insertion portions 61' of the spoke openings 60b'. Thus, the center annular flange 82b' aids in the assembly of the front wheel 16. In other words, the center annular flange 82b' must be moved or deformed again before the spokes 24 can be removed from the spoke openings 60b'. For added resiliency, an annular groove 92b' can be formed in the outer peripheral surface of the center flange 82b'.

Spoke Opening Covers

Figure 19:
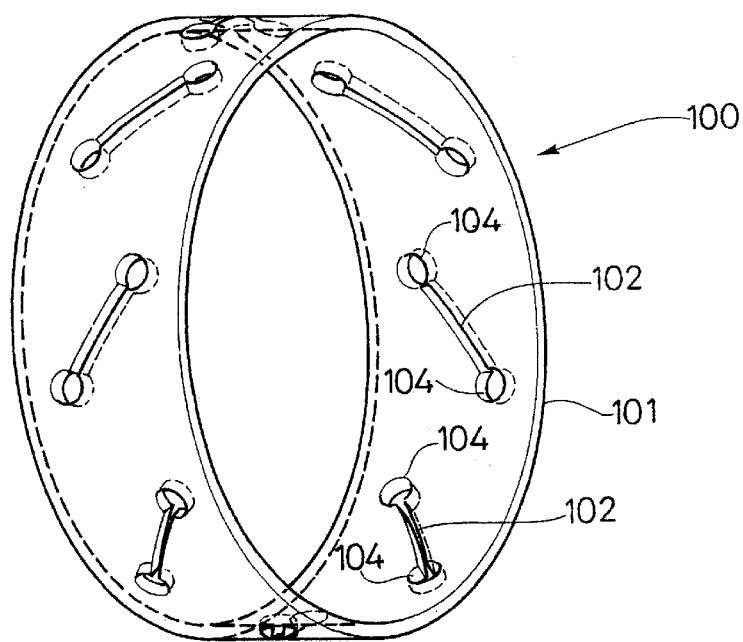
FIG. 19 is a perspective view of a first embodiment of a spoke opening cover for the hubs of the present invention.
Figure 20:
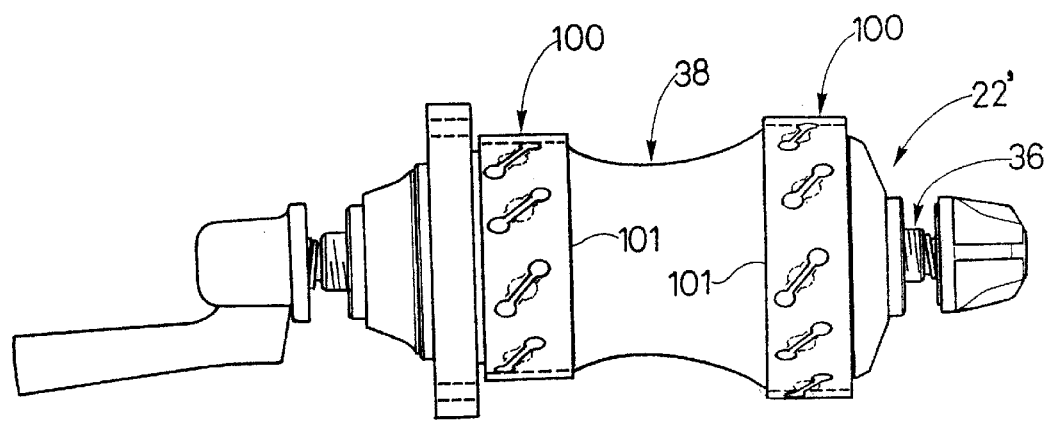
FIG. 20 is a side elevational view of the front brake disc hub with the spoke opening cover illustrated in FIG. 19 installed thereon.

As seen in FIGS. 19 and 20, a spoke opening cover 100 in accordance with one embodiment of the present invention is illustrated for use with the front hub 22' of FIGS. 15 and 16. Of course, the spoke opening cover 100 can be used with the rear hub 22 of FIGS. 4 and 5 by turning the spoke opening cover 100 inside out to reverse the direction of the slits 102. Although for purposes of brevity, the spoke opening cover 100 will only be illustrated with the front hub 22'.

The spoke opening cover 100 is used to limit or prevent contaminants from entering the hub body 38 or 38' via the spoke openings 60a, 60a' or 60b, 60b', respectively. The spoke opening cover 100 can be used instead of the spoke seals 42a, 42a' and 42b, 42b', or in conjunction with the spoke seals 42a, 42a' and 42b, 42b'. The spoke opening cover 100 basically has a resilient tubular body 101 constructed from a flexible material such as rubber. The spoke opening cover 100 has a plurality of slits 102 spaced circumferential around the tubular body 101. The tubular body 101 of the spoke opening cover 100 is configured and dimensioned to snugly fit around the bicycle hub 22' so that the spoke openings are aligned with the slits. The spoke opening cover 100 is installed on each end of the hub body 38' prior to installation of spokes 24. Since this embodiment is used with the bicycle hubs 22 and 22', the slits 102 extend diagonally relative a center axis of the tubular body. The slits 102 have enlarged openings 104 at each end. The enlarged openings 104 align with the retaining portions 62' of the spoke openings 60a' or 60b', while the center sections of the slits 102 overlie the insertion portions 61' of the spoke openings 60a' or 60b'. Also, the center sections of the slits 102 hold the spokes 24 in the retaining portions 62' to aid in the assembly of the wheel.

Figure 4:
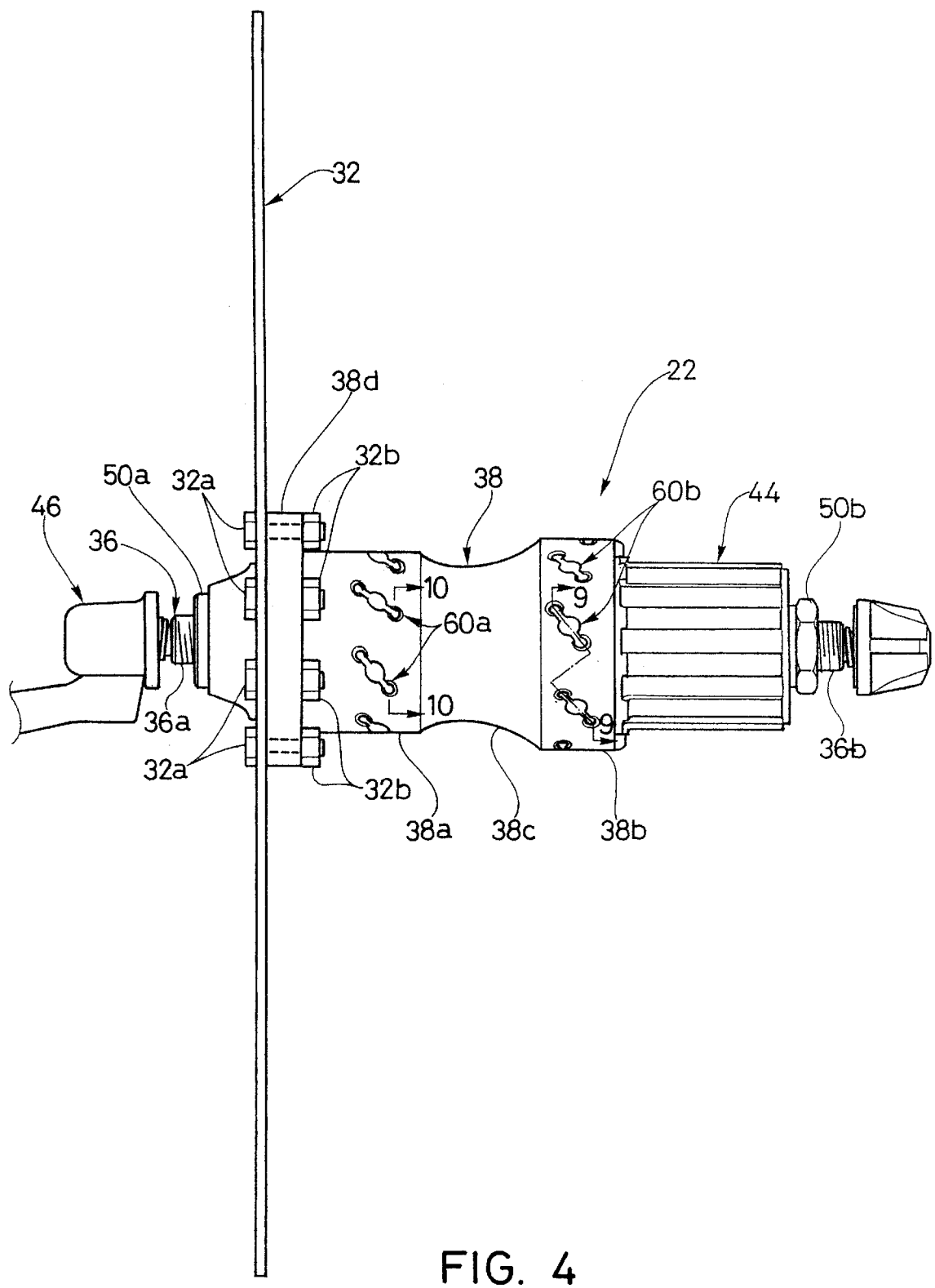
FIG. 4 is a side elevational view of the rear brake disc hub of the rear wheel illustrated in FIG. 2 with the sprockets removed.
Figure 21:
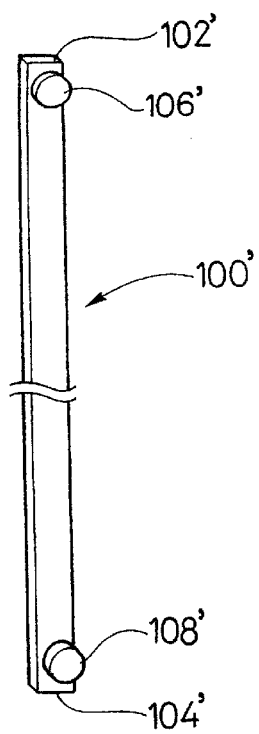
FIG. 21 is a perspective view of a second embodiment of a spoke opening cover for the hubs of the present invention.
Figure 22:
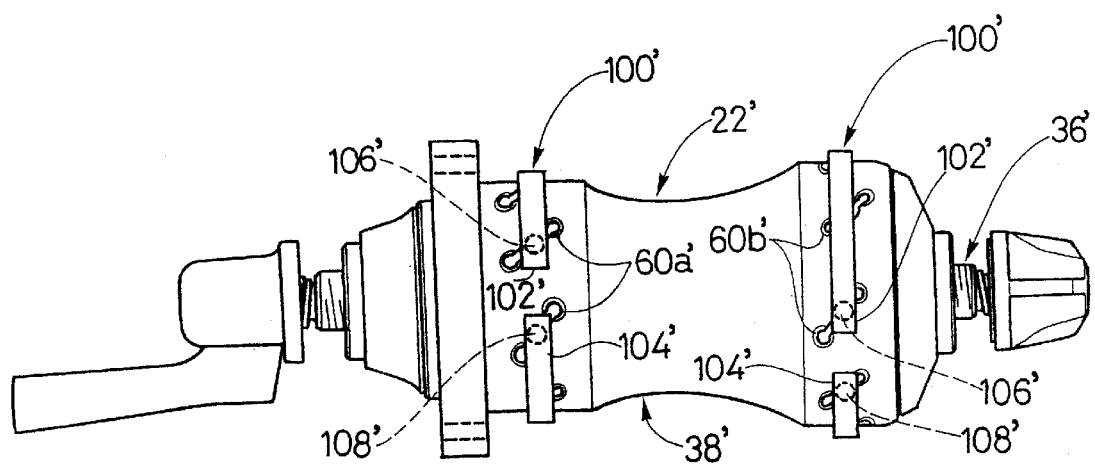
FIG. 22 is a side elevational view of the front brake disc hub with the spoke opening cover illustrated in FIG. 21 installed thereon.

As seen in FIGS. 21 and 22, a spoke opening cover 100' in accordance with an alternate embodiment of the present invention is illustrated for use with the bicycle either the rear hub 22 of FIGS. 4 and 5 or the front hub 22' of FIGS. 15 and 16. Although for purposes of brevity, the spoke opening cover 100' will only be illustrated with the front hub 22'.

The spoke opening cover 100' is used to limit or prevent contaminants from entering the hub body 38 or 38' via the spoke openings 60a, 60a' or 60b, 60b', respectively. The spoke opening cover 100' can be used instead of the spoke seals 42a, 42a' and 42b, 42b', or in conjunction with the spoke seals 42a, 42a' and 42b, 42b'. In this embodiment, the spoke opening cover 100' is a thin flexible strip or body portion 101' having a first end 102' and a second end 104' with a predetermined length therebetween. The first end 102' is provided with a first protrusion 106', while the second end 104' is provided with a second protrusion 108'. The first and second protrusions 106' and 108' are configured and dimensioned to be frictionally retained with the insertion portions 61' of the spoke openings 60a' or 60b'. Accordingly, the first and second protrusions 106' and 108' have predetermined widths or diameters that are larger that a width of an enlarged head 24c of a spoke 24. Preferably, the body portion 101' has a predetermined width that is larger that the widths or diameters of the enlarged heads 24c of the spokes 24. In other words, the body portion 101' of the spoke opening cover 100' has a predetermined width that is larger than a width of insertion portions 61' of the spoke openings 60a' or 60b'. The spoke opening cover 100' is designed to be installed on each end of the hub body 38' after the spokes 24 have been installed into the spoke openings 60a' and 60b'.

As seen in FIGS. 23–25, a spoke opening cover 100" in accordance with another alternate embodiment of the present invention is illustrated for use with the bicycle either the rear hub 22 of FIGS. 4 and 5 or the front hub 22' of FIGS. 15 and 16. Although for purposes of brevity, the spoke opening cover 100" will only be illustrated with the front hub 22'.

The spoke opening cover 100" is used to limit or prevent contaminants from entering the hub body 38 or 38' via the spoke openings 60a, 60a' or 60b, 60b', respectively. The spoke opening cover 100" can be used instead of the spoke seals 42a, 42a' and 42b, 42b', or in conjunction with the spoke seals 42a, 42a' and 42b, 42b'. In this embodiment, the spoke opening cover 100" is a thin flexible strip or body portion 101" having a first end 102" and a second end 104" with a predetermined length therebetween.

The first end 102" is provided with a tubular connector 106", while the second end 104" is provided with a mating connector 108. The tubular connector 106" is a protrusion that is configured and dimensioned to be received in one of the insertion portions 61' of the spoke openings 60a' or 60b'. The mating connector 108' is a split protrusion in the form of a resilient detent. The second end 104" is configured and dimensioned to overlap the first end 102" with mating connector 108" being retained in the bore of tubular protrusion 106" via a snap-fit. The length of body portion 101" should be such that spoke opening cover 100" snugly fits around the hub body 38' when the detent 108" is snap-fitted into the tubular protrusion 106".

Preferably, the body portion 101" has a predetermined width that is larger than the widths or diameters of the enlarged heads 24c of the spokes 24. In other words, the body portion 101" of the spoke opening cover 100" has a predetermined width that is larger than a width of insertion portions 61' of the spoke openings 60a' or 60b'. The spoke opening cover 100" is designed to be installed on each end of the hub body 38' after the spokes 24 have been installed into the spoke openings 60a' and 60b'.

Second Embodiment

Referring now to FIGS. 26–29, bicycle rear and front hubs 122 and 122' are illustrated in accordance with a second embodiment of the present invention. The rear and front hubs 122 and 122' of this second embodiment are substantially the same as the first embodiment, except that the spoke hole openings 60a, 60a' and 60b, 60b' of the first embodiment have been replaced with modified spoke openings 160a, 160a' and 160b, 160b' that each receive a single spoke as explained below. Since the rear and front hubs 122 and 122' are substantially the same as the rear and front hubs 22 and 22' of the first embodiment, this embodiment will not be discussed or illustrated in detail herein.

Figure 26:
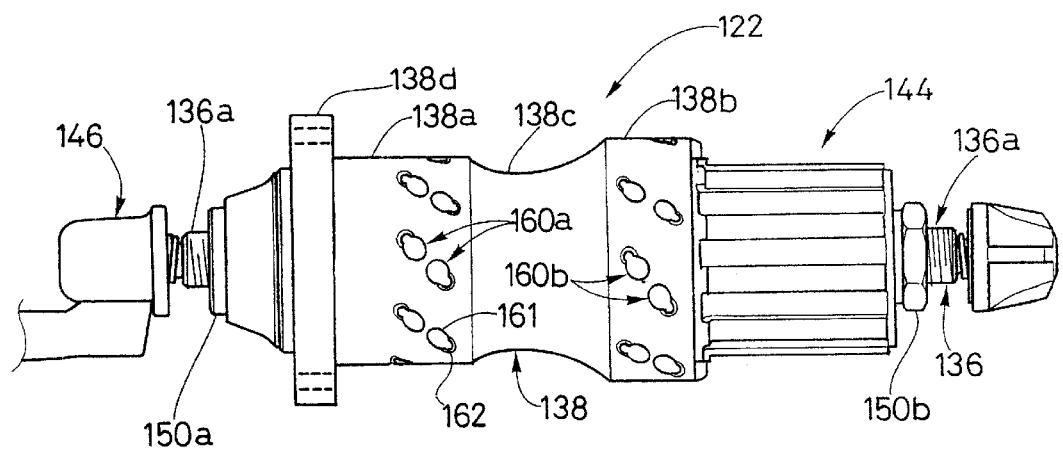
FIG. 26 is a side elevational view of the rear brake disc hub in accordance with a second embodiment of the present invention with the sprockets removed.
Figure 27:
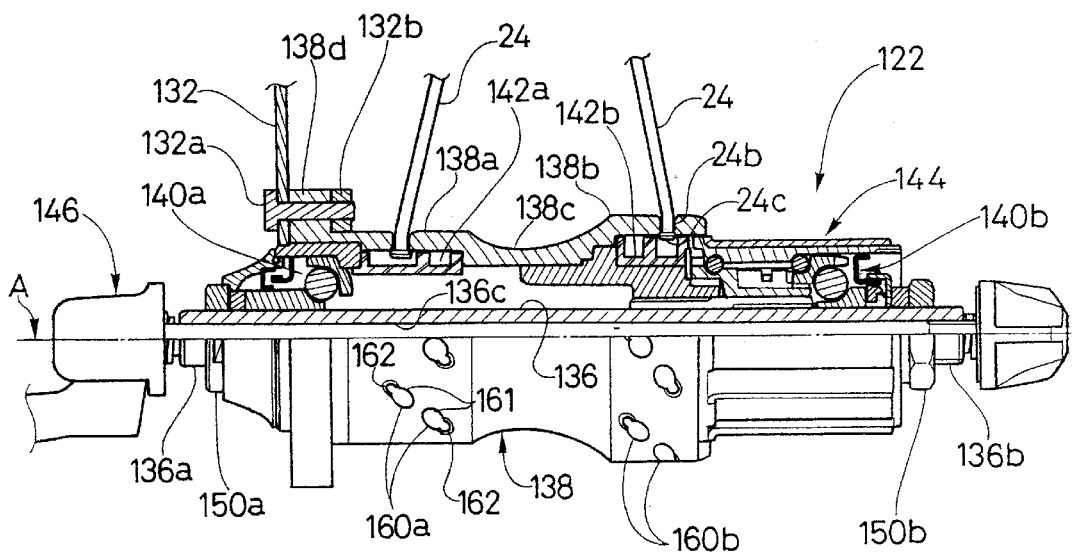
FIG. 27 a side elevational view of the rear brake disc hub illustrated in FIG. 26 in accordance with a second embodiment of the present invention with certain portions broken away for purposes of illustration.

Referring to FIGS. 26 and 27, the rear hub 122 basically includes a hub axle 136, a hub body 138, a first bearing assembly 140a, a second bearing assembly 140b, a first spoke seal 142a, a second spoke seal 142b, a freewheel 144 and a quick release mechanism 146. The hub axle 136 has a center axis A extending between a first end 136a and a second end 136b.

The quick release mechanism 146 extends through a center bore 136c of the hub axle 136 such that the quick release mechanism 146 is coupled to the hub axle 136 in a conventional manner. The first and second ends 136a and 136b of the hub axle 136 are threaded for receiving a pair of nuts 150a and 150b that applies an axial force on the hub body 138, the bearing assemblies 140a and 140b, the spoke seals 142a and 142b, and the freewheel 144. First and second bearing assemblies 140a and 140b rotatably mount the hub body 138 with the freewheel 144 on the hub axle 136. The freewheel 144 allows the hub axle 136 to rotate freely relative to the hub body 138 in one direction, but fixedly couples the hub axle 136 relative to the hub body 138 in the opposite rotational direction.

A set of first spoke openings 160a are provided at the first end section 138a of the hub body 138 for receiving the bent ends 24b of the spokes 24. Similarly, the second end section 138b of the hub body 138 is provided with a second set of spoke openings 160b for receiving the bent ends 24b of the spokes 24. In the illustrated embodiment, the first end section 138a is provided with eighteen of the first spoke openings 160a and the second end section 138b is provided with eighteen of the second spoke openings 160b. The spoke openings 160a and 160b are grouped into pairs that are equally spaced apart about the circumference of the hub body 138. Accordingly, the rear hub 122 is designed to have thirty-six spokes extending outwardly therefrom in a generally tangential direction.

Preferably, the first and second sets of spoke openings 160a and 160b are arranged identical. The first and second spoke openings 160a and 160b are designed to be used with conventional tangential spokes 24. Of course, it is possible that the first and second sets of spoke openings 160a and 160b can be different such that tangential spokes 24 are used in one end of the hub body 138 and a different types of spokes are used in the other end of the hub body 138. The first spoke openings 160a are circumferentially arranged around the hub body 138 adjacent to the brake rotor attachment portion 138d. Preferably, the first spoke openings 160a are spaced axially inward of the brake rotor attachment portion 138d so that brake disc rotor 132 can be easily attached with the bolts 132a and nuts 132b.

In this embodiment, the spoke openings 160a and 160b are arranged to form two circumferential rows of spoke openings 160a at end section 138a and two circumferential rows of spoke openings 160b at end section 138b. Each of the spoke openings 160a and 160b has an insertion portion 161 and a retaining portion 162. Adjacent pairs of the spoke openings 160a and 160b are oriented in opposite directions so that the spokes 24 extend in generally opposite directions from the hub body 138.

Each insertion portion 161 is formed by a curved or partial cylindrical surface 164 that has a width or diameter that is equal to or slightly larger than the widths or diameters of the enlarged heads 24c of the spokes 24. Thus, the inner ends (bent ends 24b with enlarged heads 24c) of the spokes 24 can be easily inserted into the spoke openings 160a and 160b through the insertion portions 161.

The retaining portions 162 have smaller widths or diameters than the insertion portions 161. More specifically, the diameters or widths of the retaining portions 162 are smaller than the diameters or widths of the enlarged heads 24c of the spokes 24 so as to retain the spokes 24 within the spoke openings 160a and 160b. The retaining portions 162 are each preferably defined by a partial cylindrical surface 166 that is connected to the curved surface 164 of the associated insertion portion 161.

Preferably, the insertion portion 161 and the retaining portions 162 of each spoke opening are formed simultaneously. Also preferably, the inner and outer ends of the retaining portions 162 of the spoke openings 160a and 160b are tapered to avoid sharp edges engaging the spokes 24.

Similar to the first embodiment, discussed above, each of the insertion portions 161 has a center longitudinal axis that passes through the center axis A of the hub axle 136. The retaining portions 162, on the other hand, have center longitudinal axes that are parallel to the center longitudinal axis of the associated insertion portion 161 for each of the spoke openings 160a and 160b. Thus, the center longitudinal axes of the retaining portions 162 do not pass through the center axis of the hub axle 136, similar to the first embodiment. Rather, the center longitudinal axes of the retaining portions 162 are angled with respect to center axis A. Preferably, the center longitudinal axis of each retaining portion 162 is angled between about 5° and about 20° from a radial orientation in the hub body 138. In the illustrated embodiment, the retaining portions 162 are angled about 10° with respect to center axis A for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 162 are preferably angled about 11° with respect to center axis A. This angled configuration of the retaining portions 162 results in the straight sections 24a of the spokes 24 being easily arranged in a tangential direction relative to an imaginary circle centered on the hub body 138. Moreover, this angled configuration of the retaining portions 162 allows the straight sections 24a of the spokes 24 to be easily aligned with the spoke holes of the rim without significant bending of the spokes 24. In the illustrated embodiment, the spokes 24 are not bent more than about five degrees.

Figure 28:
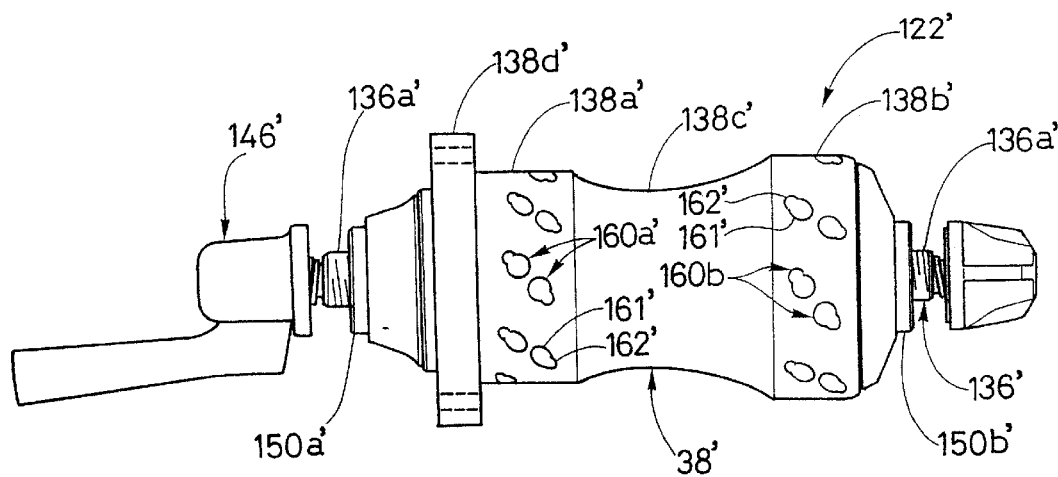
FIG. 28 is a side elevational view of the front brake disc hub in accordance with a second embodiment of the present invention with the sprockets removed.
Figure 29:
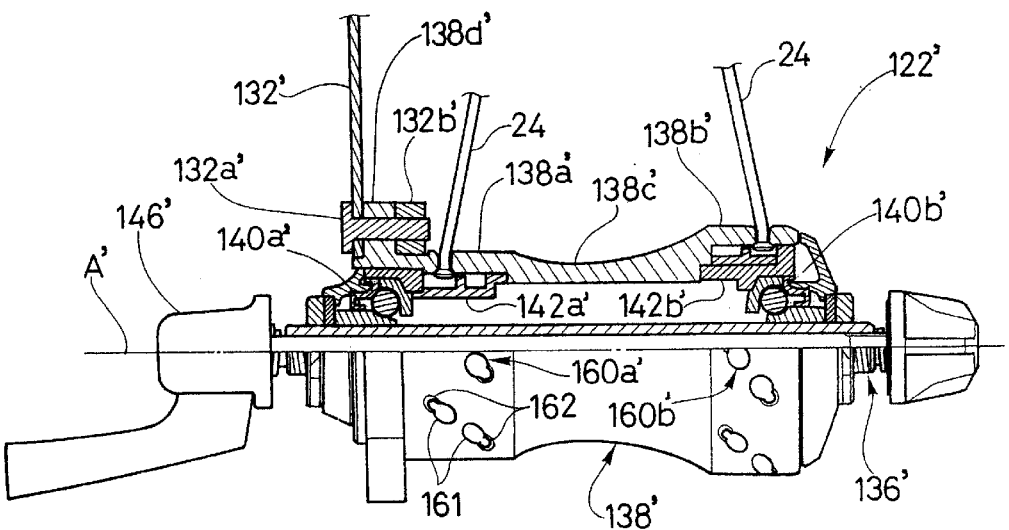
FIG. 29 a side elevational view of the front brake disc hub illustrated in FIG. 28 in accordance with a second embodiment of the present invention with certain portions broken away for purposes of illustration.

Referring to FIGS. 28 and 29, the front hub 122' basically includes a hub axle 136', a hub body 138', a first bearing assembly 140a', a second bearing assembly 140b', a first spoke seal 142a', a second spoke seal 142b', and a quick release mechanism 146'. The hub axle 136' has a center axis A' extending between a first end 136a' and a second end 136b'.

The quick release mechanism 146' extends through a center bore 136c' of the hub axle 136' such that the quick release mechanism 146' is coupled to the hub axle 136' in a conventional manner. The first and second ends 136a' and 136b' of the hub axle 136' are threaded for receiving a pair of nuts 150a' and 150b' that applies an axial force on the hub body 138', the bearing assemblies 140a' and 140b' and the spoke seals 142a' and 142b'. First and second bearing assemblies 140a' and 140b' rotatably mount the hub body 138' on the hub axle 136'.

A set of first spoke openings 160a' are provided at the first end section 138a' of the hub body 138' for receiving the bent ends 24b of the spokes 24. Similarly, the second end section 138b' of the hub body 138' is provided with a second set of spoke openings 160b' for receiving the bent ends 24b of the spokes 24. In the illustrated embodiment, the first end section 138a' is provided with eighteen of the first spoke openings 160a' and the second end section 138b' is provided with eighteen of the second spoke openings 160b'. The spoke openings 160a' and 160b' are grouped into pairs that are equally spaced apart about the circumference of the hub body 138'. Accordingly, the front hub 122' is designed to have thirty-six spokes extending outwardly therefrom in a generally tangential direction.

The first spoke openings 160a' are circumferentially arranged around the hub body 138' adjacent to the brake rotor attachment portion 138d'. Preferably, the first spoke openings 160a' are spaced axially inward of the brake rotor attachment portion 138d' so that brake disc rotor 132' can be easily attached with the bolts 132a' and nuts 132b'.

In this embodiment, the spoke openings 160a' and 160b' are arranged to form two circumferential rows of spoke openings 160a' at end section 138a' and two circumferential rows of spoke openings 160b' at end section 138b '. Each of the spoke openings 160a' and 160b' has an insertion portion 161' and a retaining portion 162'. Adjacent pairs of the spoke openings 160a' and 160b' are oriented in opposite directions so that the spokes 24 extend in generally opposite directions from the hub body 138'.

Each insertion portion 161' is formed by a curved or partial cylindrical surface 164' that has a width or diameter that is equal to or slightly larger than the widths or diameters of the enlarged heads 24c of the spokes 24. Thus, the inner ends (bent ends 24b with enlarged heads 24c) of the spokes 24 can be easily inserted into the spoke openings 160a' and 160b' through the insertion portions 161'.

The retaining portions 162' have smaller widths or diameters than the insertion portions 161'. More specifically, the diameters or widths of the retaining portions 162' are smaller than the diameters or widths of the enlarged heads 24c of the spokes 24 so as to retain the spokes 24 within the spoke openings 160a' and 160b'. The retaining portions 162' are each preferably defined by a partial cylindrical surface 166' that is connected to the curved surface 164' of the associated insertion portion 161'.

Preferably, the insertion portion 161' and the retaining portions 162' of each spoke opening are formed simultaneously. Also preferably, the inner and outer ends of the retaining portions 162' of the spoke openings 160a' and 160b' are tapered to avoid sharp edges engaging the spokes 24.

Similar to the first embodiment, discussed above, each of the insertion portions 161' has a center longitudinal axis that passes through the center axis A' of the hub axle 136'. The retaining portions 162', on the other hand, have center longitudinal axes that are parallel to the center longitudinal axis of the associated insertion portion 161' for each of the spoke openings 160a' and 160b'. Thus, the center longitudinal axes of the retaining portions 162' do not pass through the center axis of the hub axle 136', similar to the first embodiment. Rather, the center longitudinal axes of the retaining portions 162' are angled with respect to center axis A'. Preferably, the center longitudinal axis of each retaining portion 162' is angled between about 5° and about 20° from a radial orientation in the hub body 138'. In the illustrated embodiment, the retaining portions 162' are angled about 10° with respect to center axis A' for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 162' are preferably angled about 11° with respect to center axis A'. This angled configuration of the retaining portions 162' results in the straight sections 24a of the spokes 24 being easily arranged in a tangential direction relative to an imaginary circle centered on the hub body 138'. Moreover, this angled configuration of the retaining portions 162' allows the straight sections 24a of the spokes 24 to be easily aligned with the spoke holes of the rim without significant bending of the spokes 24. In the illustrated embodiment, the spokes 24 are not bent more than about five degrees.

Third Embodiment of Front Hub

Figure 30:
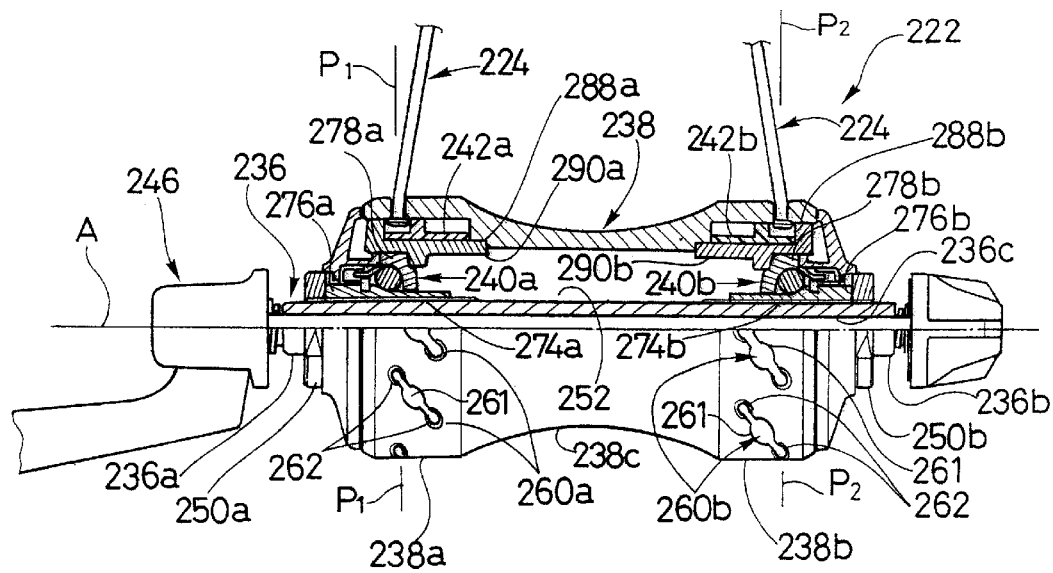
FIG. 30 is a side elevational view of a front hub of a front wheel with certain portions broken away for purposes of illustration.

Referring now to FIG. 30, a front bicycle hub 222 is illustrated in accordance with a third embodiment of the present invention. The front hub 222 of this third embodiment is substantially the same as the front hub 22' shown in FIG. 16, except that the left half of the front hub 222 has been modified to be substantially a mirror image of the right half of the front hub 222. In other words, the front hub 222 is not designed to have a disc rotor coupled thereto. Since the front hub 222 is substantially the same as the front hub 22' of the first embodiment, this third embodiment will not be discussed or illustrated in detail herein.

The front hub 222 basically includes a hub axle 236, a hub body or shell 238, a first bearing assembly 240a, a second bearing assembly 240b, a first spoke seal 242a, a second spoke seal 242b and a quick release mechanism 246. Of the parts of front hub 222, only the hub body 238 and the first and second spoke seals 242a and 242b are non-conventional parts. The remaining parts of front hub 222 are relatively conventional, and thus, the remaining parts of front hub 222 will not be discussed or illustrated in detail herein.

The hub axle 236 has a center axis A extending between a first end 236a and a second end 236b. The quick release mechanism 246 extends through a center bore 236c of the hub axle 236 such that the quick release mechanism 246 is coupled to the hub axle 236 in a conventional manner. The first and second ends 236a and 236b of the hub axle 236 are threaded for receiving a pair of nuts 250a and 250b that apply an axial force on the hub body 238, the bearing assemblies 240a and 240b and the spoke seals 242a and 242b. First and second bearing assemblies 240a and 240b rotatably mount the hub body 238 on the hub axle 236.

The hub body 238 is illustrated in accordance with one embodiment of the present invention. In this embodiment, the hub body 238 is a hollow member that defines an interior passageway 252 with the hub axle 236 being rotatably supported therein by the first and second bearing assemblies 240a and 240b. Thus, the hub body 238 is a substantially tubular member. Specifically, the hub body 238 has a center tubular portion 238c with first and second end sections 238a and 238b being integral formed with the center tubular portion 238c as a one-piece, unitary member.

A set of first spoke openings 260a are provided at the first end section 238a of the hub body 238 for receiving the bent ends of the spokes 224. Similarly, the second end section 238b of the hub body 238 is provided with a second set of spoke openings 260b for receiving the bent ends of the spokes 224. In the illustrated embodiment, the first end section 238a is provided with nine of the first spoke openings 260a and the second end section 238b is provided with nine of the second spoke openings 260b. The spoke openings 260a and 260b are equally spaced apart about the circumference of the hub body 238. Each of the spoke openings 260a and 260b are also designed to receive two spokes 224 as explained below. Accordingly, the front hub 222 is designed to have thirty-six spokes extending outwardly therefrom in a generally tangential direction.

Preferably, the first and second sets of spoke openings 260a and 260b are identical, expect that the first and second sets of spoke openings 260a and 260b are circumferential offset, i.e., not axially aligned. The first and second spoke openings 260a and 260b are designed to be used with tangential spokes 224. Of course, it is possible that the first and second sets of spoke openings 260a and 260b can be different such that tangential spokes 224 are used in one end of the hub body 238 and a different types of spokes are used in the other end of the hub body 238.

Figure 9:
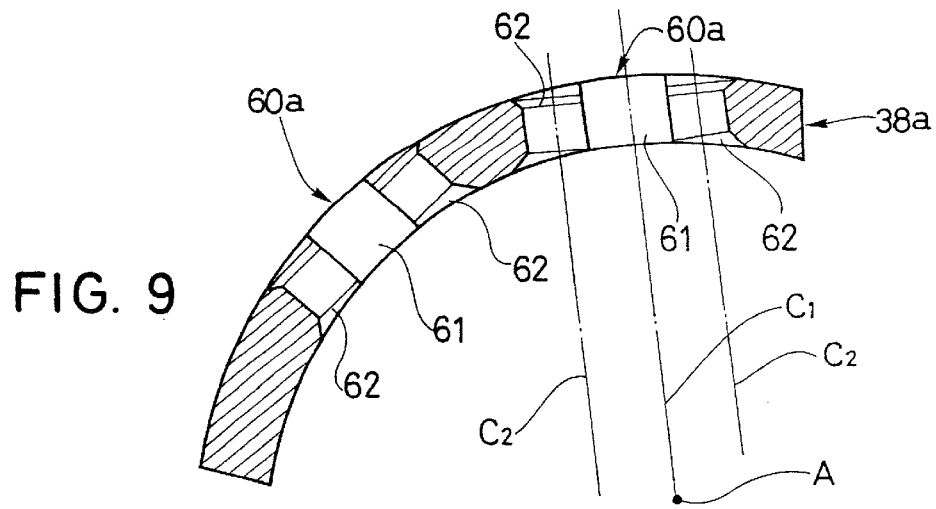
FIG. 9 is a partial transverse cross-sectional view of the rear brake disc hub body illustrated in FIGS. 4 and 5 as seen along section line 9—9 of FIG. 4.
Figure 10:
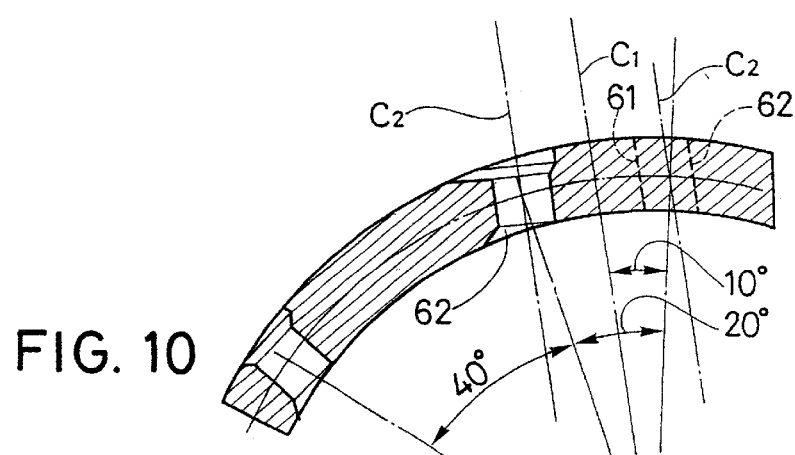
FIG. 10 is a partial transverse cross-sectional view of the rear brake disc hub body illustrated in FIGS. 4 and 5 as seen along section line 10—10 of FIG. 4.
Figure 11:
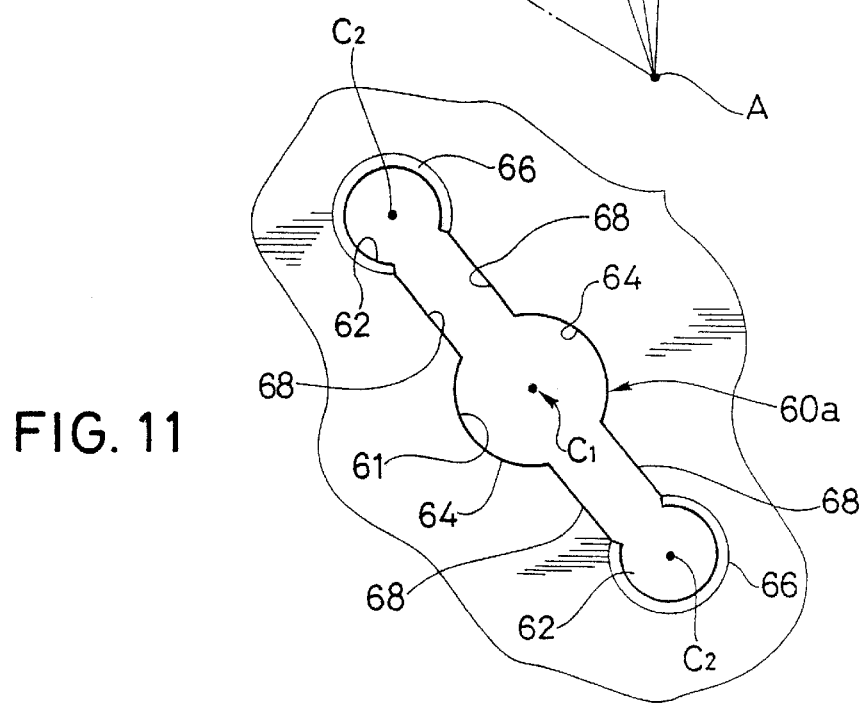
FIG. 11 is a partial elevational view of one of the spoke openings of the rear brake disc hub body illustrated in FIGS. 4 and 5.
Figure 12:
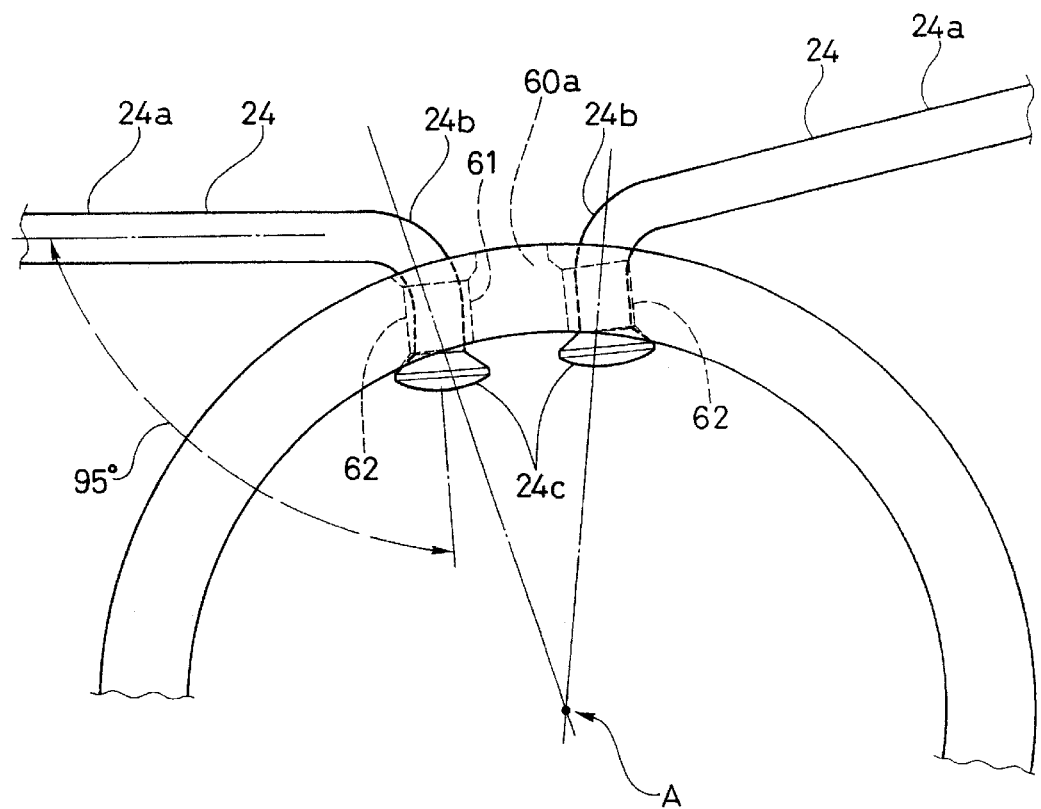
FIG. 12 is a schematic view of portion of the rear brake disc hub body illustrated in FIGS. 4 and 5 with two spokes extending outwardly therefrom.

In this embodiment, the first and second spoke openings 260a and 260b are elongated slots that are each provided with an insertion portion 261 and a pair of retaining portions 262. Accordingly, each of the spoke openings 260a and 260b is designed to have a pair of spokes 224 retained therein with the spokes 224 extending in opposite directions. The first and second spoke openings 260a and 260b have the identical shapes as the spoke openings 60a as seen in FIGS. 9–11.

Bearing assemblies 240a and 240b rotatably supports hub body 238 on hub axle 236. In this embodiment, bearing assemblies 240a and 240b are identical to each other, except that they are mirror images of each other. The bearing assembly 240a basically includes a plurality of balls 274a located between an inner race member 276a and an outer race member 278a. Similarly, the bearing assembly 240b basically includes a plurality of balls 274b located between an inner race member 276b and an outer race member 278b. Since bearing assemblies 240a and 240b are well known in the bicycle art, they will not be discussed or illustrated in detail herein.

However, the arrangement of the bearing assemblies 240a and 240b relative to the first and second spoke openings 260a and 260b is unique in that the bearing assemblies 240a and 240b are located at least partially beneath the first and second spoke openings 260a and 260b. This arrangement provides for better rigidity of the wheel and the hub axle 236. Specifically, the outer circumferential rows of the retaining portions 262 of the first and second spoke openings 260a and 260b have their centers lying on radial planes $P_1$ and $P_2$, respectively. As seen in FIG. 30, the planes $P_1$ and $P_2$ intersect at least part of the bearing assemblies 240a and 240b, respectively. Plane $P_1$ passes through the balls 274a, the inner race member 276a and the outer race member 278a. Similarly, the plane $P_2$ passes through the balls 274b, the inner race member 276b and the outer race member 280b.

The spoke seals 242a and 242b are arranged in the interior passageway 252 of the hub body 238 so as to be adjacent the spoke openings 260a and 260b to isolate the spoke openings 260a and 260b from the hub axle 236. In other words, the spoke seals 242a and 242b prevent contaminants from entering the front hub 222 through the spoke openings 260a and 260b. The spoke seals 242a and 242b are preferably resilient members that are constructed of rubber or the like. Of course, it will be apparent to those skilled in the art from this disclosure that the seals could be created from other types of materials, depending upon their shape and arrangement.

In the preferred embodiment, the spoke seals 242a and 242b also aid in the assembly of the spokes 224 with the hub body 238 and the rim. Specifically, in the preferred embodiments, the seals 242a and 242b are arranged so that they restrain movement of the spokes 224 within the spoke openings 260a and 260b so that the bent ends of the spokes 224 stays in the retaining portions 262 of the spoke openings 260a and 260b. The seals 242a and 242b are identical in construction to the seal 42b' as seen in FIG. 18.

Third Embodiment of Rear Hub

Figure 31:
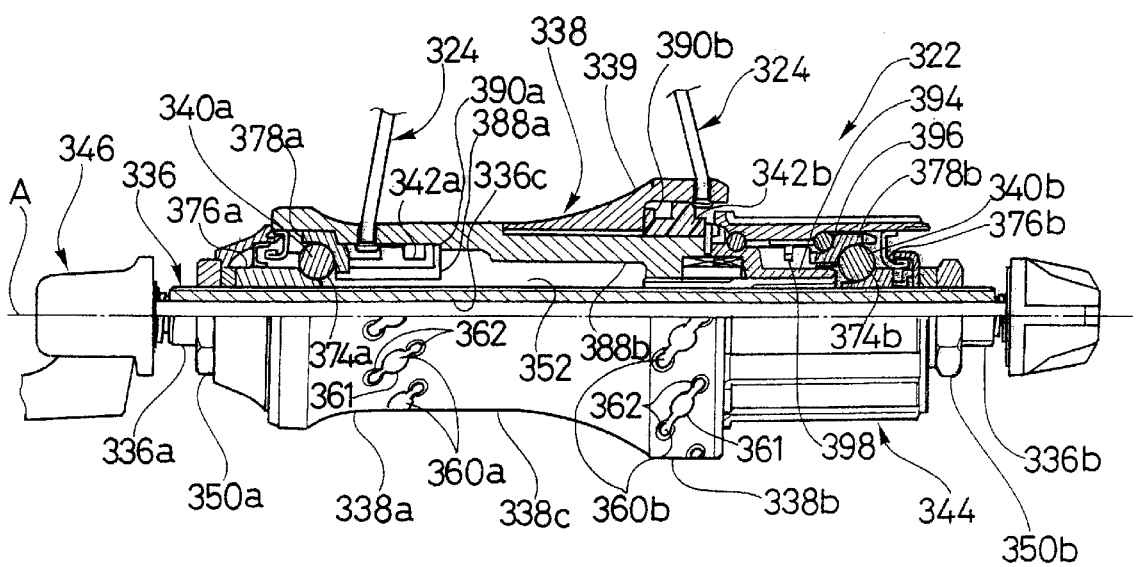
FIG. 31 is a side elevational view of a rear hub for a rear wheel with certain portions broken away for purposes of illustration.

Referring now to FIG. 31, a rear bicycle hub 322 is illustrated in accordance with a third embodiment of the present invention. The rear hub 322 of this third embodiment includes many of the same features of the rear hub 22 as seen in FIG. 5. Therefore, the common features between the rear hub 22 and the rear hub 322 will not be discussed herein when describing the rear hub 322.

The rear hub 322 basically includes a hub axle 336, a hub body or shell 338 (two parts), a first bearing assembly 340a, a second bearing assembly 340b, a first spoke seal 342a, a second spoke seal 342b, a freewheel 344 and a quick release mechanism 346. Of the parts of rear hub 322, only the hub body 338 and the first and second spoke seals 342a and 342b are non-conventional parts. The remaining parts of rear hub 322 are relatively conventional, and thus, the remaining parts of rear hub 322 will not be discussed or illustrated in detail herein.

The hub axle 336 has a center axis A extending between a first end 336a and a second end 336b. The quick release mechanism 346 extends through a center bore 336c of the hub axle 336 such that the quick release mechanism 346 is coupled to the hub axle 336 in a conventional manner. The first and second ends 336a and 336b of the hub axle 336 are threaded for receiving a pair of nuts 350a and 350b that apply an axial force on the hub body 338, the bearing assemblies 340a and 340b, the spoke seals 342a and 342b, and the freewheel 344. First and second bearing assemblies 340a and 340b rotatably mount the hub body 338 with the freewheel 344 on the hub axle 336. The freewheel 344 allows the hub axle 336 to rotate freely relative to the hub body 338 in one direction, but fixedly couples the hub axle 336 relative to the hub body 338 in the opposite rotational direction.

The hub body 338 of this embodiment of the present invention is constructed of two pieces. In this embodiment, the hub body 338 is a hollow member that defines an interior passageway 352 with the hub axle 336 being rotatably supported therein by the first and second bearing assemblies 340a and 340b. Thus, the hub body 338 is a substantially tubular member. Specifically, the hub body 338 has a center tubular portion 338c with first and second end sections 338a and 338b.

The first end section 338a is integrally formed with the center tubular portion 338c and the inner ring portion 388b as a one-piece, unitary member. The second end section 338b of the hub body 338 is constructed of two pieces (outer member or portion 339 and inner ring member or portion 388b ). The second end section 338b has the freewheel 344 fixedly coupled thereto. Preferably, the outer portion 339 has internal threads that engage external threads of the inner ring portion 388b to fixedly couple them together and to prevent relative rotation therebetween. The outer portion 339 is held on the inner ring portion 388b by the axial force applied to the various parts of the hub 322 by nuts 350a and 350b. This type of arrangement reduces the manufacturing costs of the hub shell or body 338.

A set of first spoke openings 360a are provided at the first end section 338a of the hub body 338 for receiving the bent ends of the spokes 324. Similarly, the second end section 338b of the hub body 338 is provided with a second set of spoke openings 360b for receiving the bent ends of the spokes 324. In the illustrated embodiment, the first end section 338a is provided with nine of the first spoke openings 360a and the second end section 338b is provided with nine of the second spoke openings 360b. The spoke openings 360a and 360b are equally spaced apart about the circumference of the hub body 338. Each of the spoke openings 360a and 360b are also designed to receive two spokes 324 as explained below. Accordingly, the rear hub 322 is designed to have thirty-six spokes extending outwardly therefrom in a generally tangential direction.

Preferably, the first and second sets of spoke openings 360a and 360b are identical, expect that the first and second sets of spoke openings 360a and 360b are circumferential offset, i.e., not axially aligned. The first and second spoke openings 360a and 360b are designed to be used with tangential spokes 324.

In this embodiment, the first and second spoke openings 360a and 360b are elongated slots that are each provided with an insertion portion 361 and a pair of retaining portions 362. Accordingly, each of the spoke openings 360a and 360b is designed to have a pair of spokes 324 retained therein with the spokes 324 extending in opposite directions. The first and second spoke openings 360a and 360b have the identical shapes as the spoke openings 60a as seen in FIGS. 9–10.

Bearing assemblies 340a and 340b rotatably supports hub body 338 on hub axle 336. The bearing assembly 340a basically includes a plurality of balls 374a located between an inner race member 376a and an outer race member 378a. Similarly, the bearing assembly 340b basically includes a plurality of balls 374b located between an inner race member 376b and an outer race member 378b. Since bearing assemblies 340a and 340b are well known in the bicycle art, they will not be discussed or illustrated in detail herein.

The spoke seals 342a and 342b are arranged in the interior passageway 352 of the hub body 338 so as to be adjacent the spoke openings 360a and 360b to isolate the spoke openings 360a and 360b from the hub axle 336. In other words, the spoke seals 342a and 342b prevent contaminants from entering the rear hub 322 through the spoke openings 360a and 360b. The spoke seals 342a and 342b are preferably resilient members that are constructed of rubber or the like. Of course, it will be apparent to those skilled in the art from this disclosure that the seals could be created from other types of materials, depending upon their shape and arrangement.

In the preferred embodiment, the spoke seals 342a and 342b also aid in the assembly of the spokes 324 with the hub body 338 and the rim. Specifically, in the preferred embodiments, the seals 342a and 342b are arranged so that they restrain movement of the spokes 324 within the spoke openings 360a and 360b so that the bent ends of the spokes 324 stay in the retaining portions 362 of the spoke openings 360a and 360b.

In this embodiment, the ring-shaped member 388a and the inner ring member or portion 388b support the spoke seals 342a and 342b from moving inwardly in a radial direction. More specifically, these members are constructed of rigid material and have an annular ring-shape that prevents the radial inward movement of the spoke seals 342a and 342b. The particular shape of the ring members 388a and 388b depend upon the adjacent structures of the hub. Accordingly, their specific shapes will not be discussed or illustrated in detail herein.

In the illustrated embodiment, the spoke seal 342a has a tubular section and a center annular flange. The center annular flange of the spoke seal 342a extends in a circumferential direction about the tubular section. The center annular flange can either contact the interior surface of the hub body 338 or be spaced from the hub body 338. The particular shape of the ends of the spoke seal 342a will vary depending on the shape of the hub body 338 and its internal parts.

When the rear hub 322 is assembled, an axial force is applied to the ends of the tubular section of the spoke seal 342a to form annular seals therebetween. Thus, the spoke seal 342a isolates a first interior section of the interior passageway 352 from the remainder of the interior passageway 352. This interior section formed by the spoke seal 342a is continuous annular first space located beneath the spoke openings 360a. Basically, the construction of the spoke seal 342a is substantially identical in construction to the seal 32a' as seen in FIG. 17, except that the center flange has been made wider and the inner end of the seal 342a has a slightly different shape. However, the spoke seal 342a performs the same function as the seal 42a', discussed above. In particular, the spoke seal 342a is positioned to axially separate the two retaining portions 362 of each of the first spoke openings 360a from each. The center annular flange of spoke seal 342a is also positioned to keep the spokes 324 in the retaining portions 362 of the first spoke openings 360a.

Similar to the spoke seal 342a, the spoke seal 342b has a tubular section and a center annular flange. The center annular flange of the spoke seal 342b extends in a circumferential direction about the tubular section. The ends of the tubular section of the spoke seal 342b are configured to engage a ring member 388b and an abutment 390b of the inner surface of the hub body 338. Of course, the particular shape of the ends of the spoke seal 342b will vary depending on the shape of the hub body 338 and its internal components.

When the rear hub 322 is assembled, an axial force is applied to the ends of the tubular section of the spoke seal 342b to form annular seals therebetween. Accordingly, the spoke seal 342b isolates a second interior section of the interior passageway 352 from the remainder of the interior passageway 352. This interior section formed by the spoke seal 342b is a continuous annular second space located beneath the spoke openings 360b.

The center annular flange of the spoke seal 342b is preferably aligned with a radial plane passing through the centers axes of the insertion portions 361 of the second spoke openings 360b. Thus, the center annular flange of the spoke seal 342b is positioned to axially separate the two retaining portions 362 of each of the second spoke openings 360b from each other. The center annular flange of the spoke seal 342b is also positioned to keep spokes 324 in the retaining portions 362 of the second spoke openings 360b. Accordingly, when the enlarged heads of the spokes 324 are inserted into the insertion portions 361 of the spoke openings 360b, the enlarged heads of the spokes 324 contact the center annular flange of the spoke seal 342b. The enlarged heads then push or deform the center annular flange of the spoke seal 342b one way or the other so that the enlarged heads extend into the insertion portions 361 of the spoke openings 360b. The spokes 324 are then moved or slid into one of the two retaining portions 362 of each of the spoke openings 360b. The center annular flange of the spoke seal 342b will prevent the spokes 324 from accidentally falling out of the insertion portions 361 of the spoke openings 360b. In other words, the center annular flange of the spoke seal 342b must be moved or deformed again before the spokes 324 can be removed from the spoke openings 360b.

The freewheels, such as the freewheel 344, are well known in the bicycle art, and thus, the freewheel 344 will not be illustrated or discussed in detail herein. The freewheel 344 is used to transmit a driving force from the chain to the rear bicycle wheel in one rotation direction only. The freewheel 344 allows the bicycle to advance freely without any rotation of the pedals. The freewheel 344 is fastened to the rear hub 322 as integral part of the rear hub 322 in a conventional manner. The freewheel 344 has an outer tubular part 394, an inner tubular part 396 and a one-way clutch 398. The inner tubular part 396 is installed radially inwardly of the outer tubular part 394 so that the inner tubular part 396 is free to rotate relative to the outer tubular part 394. The one-way clutch 398 is installed between the outer tubular part 394 and inner tubular part 396 for transmitting the driving force from the outer tubular part 394 to the inner tubular part 396 in one rotational direction only. The outer tubular part 394 has a plurality of gears or sprockets (not shown) mounted thereon, while the inner tubular part 396 is usually mounted on the hub axle 336.

Fourth Embodiment of Rear Hub

Referring now to FIGS. 32–36, a rear bicycle hub 422 is illustrated in accordance with a third embodiment of the present invention. The rear hub 422 of this third embodiment includes many of the same features of the rear hub 22 as seen in FIG. 5. Therefore, the common features between the rear hub 22 and the rear hub 422 will not be discussed herein when describing the rear hub 422.

The rear hub 422 basically includes a hub axle 436, a hub body or shell 438, a first bearing assembly 440a, a second bearing assembly 440b, a first spoke seal 442a with a seal support 443a, a second spoke seal 442b, a freewheel 444 and a quick release mechanism 446. Of the parts of rear hub 422, only the hub body 438 and the first and second spoke seals 442a and 442b are non-conventional parts. The remaining parts of rear hub 422 are relatively conventional, and thus, the remaining parts of rear hub 422 will not be discussed or illustrated in detail herein.

The hub axle 436 has a center axis A extending between a first end 436a and a second end 436b. The quick release mechanism 446 extends through a center bore 436c of the hub axle 436 such that the quick release mechanism 446 is coupled to the hub axle 436 in a conventional manner. The first and second ends 436a and 436b of the hub axle 436 are threaded for receiving a pair of nuts 450a and 450b that applies an axial force on the hub body 438, the bearing assemblies 440a and 440b, the spoke seals 442a and 442b, and the freewheel 444. First and second bearing assemblies 440a and 440b rotatably mount the hub body 438 with the freewheel 444 on the hub axle 436. The freewheel 444 allows the hub axle 436 to rotate freely relative to the hub body 438 in one direction, but fixedly couples the hub axle 436 relative to the hub body 438 in the opposite rotational direction.

The hub body 438 is illustrated in accordance with one embodiment of the present invention. In this embodiment, the hub body 438 is a hollow member that defines an interior passageway 452 with the hub axle 436 being rotatably supported therein by the first and second bearing assemblies 440a and 440b. Thus, the hub body 438 is a substantially tubular member. Specifically, the hub body 438 has a center tubular portion 438c with first and second end sections 438a and 438b being integral formed with the center tubular portion 438c as a one-piece, unitary member. The first end section 438a has an integrally mounted brake rotor attachment portion 438d, while a second end section 438b has the freewheel 444 fixedly coupled thereto. Each of the end sections 438a and 438b has an annular groove 439c and 439b, respectively, for receiving spoke opening covers 100' or 100" or 500 as explained below.

A set of first spoke openings 460a are provided at the first end section 438a of the hub body 438 for receiving the bent ends 424b of the spokes 424. Similarly, the second end section 438b of the hub body 438 is provided with a second set of spoke openings 460b for receiving the bent ends 424b of the spokes 424. In the illustrated embodiment, the first end section 438a is provided with nine of the first spoke openings 460a and the second end section 438b is provided with nine of the second spoke openings 460b. The spoke openings 460a and 460b are equally spaced apart about the circumference of the hub body 438. Each of the spoke openings 460a and 460b are also designed to receive two spokes 424 as explained below. Accordingly, the rear hub 422 is designed to have thirty-six spokes extending outwardly therefrom in a generally tangential direction.

Preferably, the first and second sets of spoke openings 460a and 460b are identical. The first and second spoke openings 460a and 460b are designed to be used with conventional tangential spokes 424. Of course, it is possible that the first and second sets of spoke openings 460a and 460b can be different such that tangential spokes 424 are used in one end of the hub body 438 and a different types of spokes are used in the other end of the hub body 438. The first spoke openings 460a are circumferentially arranged around the hub body 438 adjacent to the brake rotor attachment portion 438d. Preferably, the first spoke openings 460a are spaced axially inward of the brake rotor attachment portion 438d so that a brake disc rotor can be easily attached thereto via the bolts and nuts in the same manner as illustrated in FIG. 5.

In this embodiment, the first and second spoke openings 460a and 460b are elongated slots that are each provided with an insertion portion 461 and a pair of retaining portions 462. Accordingly, each of the spoke openings 460a and 460b is designed to have a pair of spokes 424 retained therein with the spokes 424 extending in opposite directions.

The insertion portion 461 of each spoke opening is located between the pair of retaining portions 462 of each spoke opening. Each insertion portion 461 is formed by a pair of opposed curved surfaces that are spaced apart so as to be equal to or slightly larger than the widths or diameters of the enlarged heads of the spokes 424. Thus, the inner ends (bent ends 424b with enlarged heads) of the spokes 424 can be easily inserted into the spoke openings 460a and 460b through the insertion portions 461.

The brake rotor attachment portion 438d is integrally formed with the center tubular portion 438c of the hub body 438 as a one-piece, unitary member. In the illustrated embodiment, the brake rotor attachment portion 438d is formed with six attachment members or points with through bores 470. While six individual attachment points are preferred, it will be apparent to those skilled in the art from this disclosure that fewer or more attachment points can be utilized. Moreover, it will be apparent to those skilled in the art from this disclosure that the attachment portions could be a continuous flange, if needed and/or desired. The through bore 470 can be threaded or unthreaded. By using through bores 470 instead of blind bores, the rear hub 422 can be easily manufactured at a relatively lower cost.

Bearing assemblies 440*a* and 440*b* rotatably supports hub body 438 on hub axle 436. The bearing assembly 440*a* basically includes a plurality of balls 474*a* located between an inner race member 476*a* and an outer race member 478*a*. Similarly, the bearing assembly 440*b* basically includes a plurality of balls 474*b* located between an inner race member 476*b* and an outer race member 478*b*. Since bearing assemblies 440*a* and 440*b* are well known in the bicycle art, they will not be discussed or illustrated in detail herein.

The spoke seals 442*a* and 442*b* are arranged in the interior passageway 452 of the hub body 438 so as to be adjacent the spoke openings 460*a* and 460*b* to isolate the spoke openings 460*a* and 460*b* from the hub axle 436. In other words, the spoke seals 442*a* and 442*b* prevent contaminants from entering the rear hub 422 through the spoke openings 460*a* and 460*b*. The spoke seals 442*a* and 442*b* are preferably resilient members that are constructed of rubber or the like. Of course, it will be apparent to those skilled in the art from this disclosure that the seals could be created from other types of materials, depending upon their shape and arrangement. Moreover, it will be apparent to those skilled in the art from this disclosure that while the spoke seals 442*a* and 442*b* are illustrated as a pair of separate sealing members, the spoke seals 442*a* and 442*b* can be formed as a one-piece, unitary member.

Figure 34:
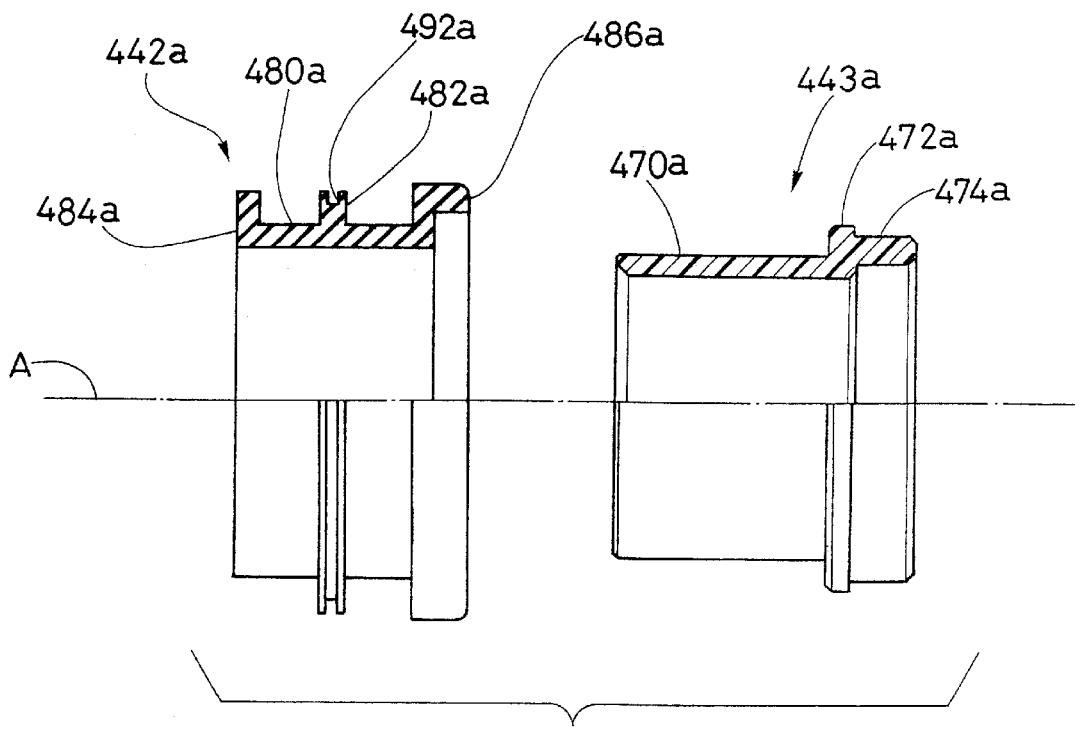
FIG. 34 is an exploded side elevational view of a seal with a seal support for the rear brake disk hub illustrated in FIGS. 32 and 33 with the upper portions broken away for purposes of illustration.

In the preferred embodiment, the spoke seals 442*a* and 442*b* also aid in the assembly of the spokes 424 with the hub body 438 and the rim. Specifically, in the preferred embodiments, the seals 442*a* and 442*b* are arranged so that they restrain movement of the spokes 424 within the spoke openings 460*a* and 460*b* so that the bent ends 424*b* of the spokes 424 stays in the retaining portions 462 of the spoke openings 460*a* and 460*b*. As best seen in FIG. 34, a left sealing assembly is formed of the spoke seal 442*a* and seal support 443*a*. The seal support 443*a* is constructed of a hard rigid plastic material that prevents the spoke seal 442*a* from being deflected radially inwardly into the interior of the hub. In other words, the seal support 443*a* maintains the spoke seal 442*a* in a sealing position.

In the illustrated embodiment, the spoke seal 442*a* has a tubular section 480*a* and a center annular flange 482*a*. The center annular flange 482*a* extends in a circumferential direction about the tubular section 480*a*. The center annular flange 482*a* can either contact the interior surface of the hub body 438 or be spaced slightly from the hub body 438. The ends 484*a* and 486*a* of the tubular section 480*a* are configured to engage a ring member 488*a* and an abutment 490*a* of the inner surface of the hub body 438. Of course, the particular shape of the ends 484*a* and 486*a* will vary depending on the shape of the hub body 438 and its internal components. Preferably, ends 484*a* and 486*a* of the tubular section 480*a* are annular flanges that contact the interior surface of the hub body 438 to form an isolated area beneath the spoke openings 460*a*. This isolated area beneath the spoke openings 460*a* is a continuous annular space.

When the rear hub 422 is assembled, an axial force is applied to the ends 484*a* and 486*a* of the tubular section 480*a* to form annular seals therebetween. Accordingly, the spoke seal 442*a* isolates a first interior section of the interior passageway 452 from the remainder of the interior passageway 452. This interior section formed by the spoke seal 442*a* is continuous annular first space located beneath the spoke openings 460*a*.

The center annular flange 482*a* is preferably aligned with a radial plane passing through the centers axes of the insertion portions 461 of the first spoke openings 460*a*. Thus, the center annular flange 482*a* is positioned to axially separate the two retaining portions 462 of each of the first spoke openings 460*a* from each other. The center annular flange 482*a* is also positioned to keep spokes 424 in the retaining portions 462 of the first spoke openings 460*a*. Accordingly, when the enlarged heads 424*c* of the spokes 424 are inserted into the insertion portions 461 of the spoke openings 460*a*, the enlarged heads 424*c* of the spokes 424 contact the center annular flange 482*a*. The enlarged heads 424*c* then push or deform the center annular flange 482*a* one way or the other so that the enlarged heads 424*c* extends into the insertion portions 461 of the spoke openings 460*a*. The spokes 424 are then moved or slid into one of the two retaining portions 462 of each of the spoke openings 460*a*. The center annular flange 482*a* will prevent the spokes 424 from accidentally falling out of the insertion portions 461 of the spoke openings 460*a*. Thus, the center annular flange 482*a* aids in the assembly of the rear wheel. In other words, the center annular flange 482*a* must be moved or deformed again before the spokes 424 can be removed from the spoke openings 460*a*.

Figure 33:
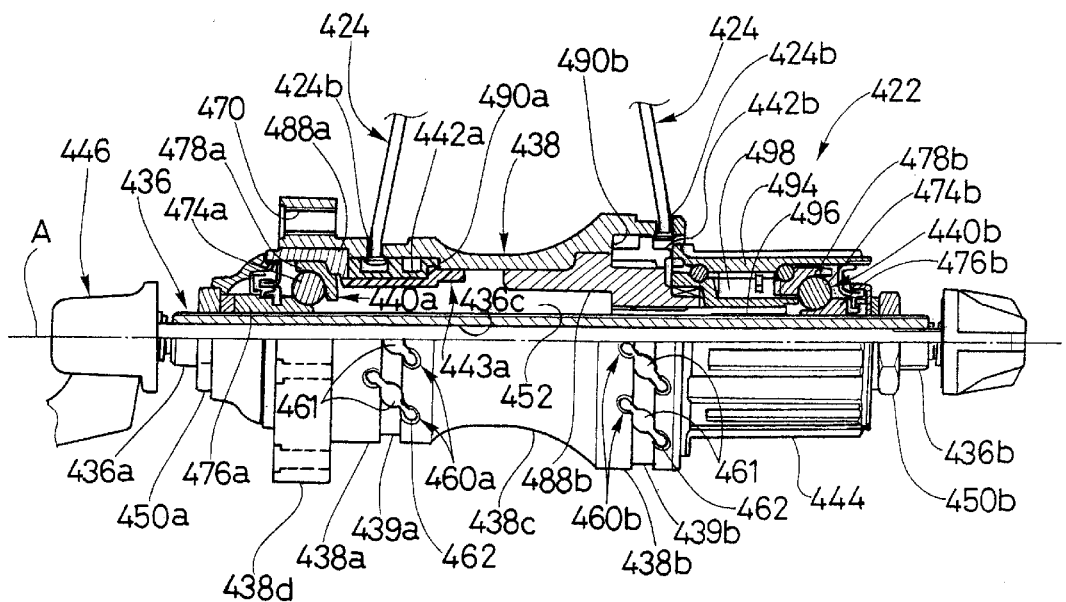
FIG. 33 is a side elevational view of the rear brake disk hub illustrated in FIG. 32 with certain portions broken away for purposes of illustration and a pair of spokes attached thereto.

The seal support 443*a*, as seen in FIGS. 33 and 34, is a substantially tubular member constructed of a relatively hard rigid material, such as a hard plastic material. The configuration of seal support 443*a* should basically compliment the interior surface of the spoke seal 442*a*. In other words, the seal support 443*a* is located within the interior bore of the spoke seal 442*a* so as to provide radial support to spoke seal 442*a*. In the illustrated embodiment, the seal support 443*a* has a first tubular portion 470*a*, an annular flange 472*a* and a second annular or cylindrical portion 474*a*. When the seal support 443*a* is located within seal 442*a*, the exterior surfaces of the cylindrical portions 470*a* and 474*a* contact the step-shaped inner surface of the tubular section 480*a*.

Similar to the spoke seal 442*a*, the spoke seal 442*b* has a tubular section 480*b* and a center annular flange 482*b*. The center annular flange 482*a* extends in a circumferential direction about the tubular section 480*a*. Alternatively, the center annular flanges 482*a* and 482*b* of the spoke seals 442*a* and 442*b* can each have a pair of center annular flanges. The end 484*b* of the tubular section 480*b* is configured to engage a ring member 488*b* and an abutment 490*b* of the inner surface of the hub body 438. The end 486*b* of the tubular section 480*b* is configured to be engaged to the ring member 488*b* and a part of the freewheel 444. Of course, the particular shape of the ends 484*b* and 486*b* will vary depending on the shape of the hub body 438 and its internal components. Preferably, the end 486*b* of the tubular section 480*b* has an inwardly extending annular flange that contacts the outer surface of the ring member 488*b*.

When the rear hub 422 is assembled, an axial force is applied to the ends 484*b* and 486*b* of the tubular section 480*b* to form annular seals therebetween. Accordingly, the spoke seal 442*b* isolates a second interior section of the interior passageway 452 from the remainder of the interior passageway 452. This interior section formed by the spoke seal 442*b* is continuous annular second space located beneath the spoke openings 460*b*.

Similar to the center annular flange 482a, the center annular flange 482b is preferably aligned with a radial plane passing through the centers axes of the insertion portions 461 of the second spoke openings 460b. Thus, the center annular flange 482b is positioned to axially separate the two retaining portions 462 of each of the second spoke openings 460b from each other. The center annular flange 482b is also positioned to keep spokes 424 in the retaining portions 462 of the second spoke openings 460b. Accordingly, when the enlarged heads 424c of the spokes 424 are inserted into the insertion portions 461 of the spoke openings 460b, the enlarged heads 424c of the spokes 424 contact the center annular flange 482b. The enlarged heads 424c then pushes or deforms the center annular flange 482b one way or the other so that the enlarged heads 424c extends into the insertion portions 461 of the spoke openings 460b. The spokes 424 are then moved or slid into one of the two retaining portions 462 of each of the spoke openings 460b. The center annular flange 482b will prevent the spokes 424 from accidentally falling out of the insertion portions 461 of the spoke openings 460b. Thus, the center annular flange 482b aids in the assembly of the rear wheel. In other words, the center annular flange 482b must be moved or deformed again before the spokes 424 can be removed from the spoke openings 460b.

The ring-shaped member 488b is non-rotatably coupled to the hub body 438. The ring member 488b has the freewheels 444 rotatably mounted thereon. The ring member 488b also provides radial support for the spoke seal 442b.

The freewheels, such as the freewheel 444, are well known in the bicycle art, and thus, the freewheel 444 will not be illustrated or discussed in detail herein. The freewheel 444 is used to transmit a driving force from the chain to the rear bicycle wheel in one rotation direction only. The freewheel 444 allows the bicycle to advance freely without any rotation of the pedals. The freewheel 444 is fastened to the rear hub 422 as integral part of the rear hub 422 in a conventional manner. The freewheel 444 has an outer tubular part 494, an inner tubular part 496 and a one-way clutch 498. The inner tubular part 496 is installed radially inwardly of the outer tubular part 494 so that the inner tubular part 496 is free to rotate relative to the outer tubular part 494. The one-way clutch 498 is installed between the outer tubular part 494 and inner tubular part 496 for transmitting the driving force from the outer tubular part 494 to the inner tubular part 496 in one rotational direction only. The outer tubular part 494 has a plurality of gears or sprockets (not shown) mounted thereon, while the inner tubular part 496 is usually mounted on the hub axle 436.

Figure 32:
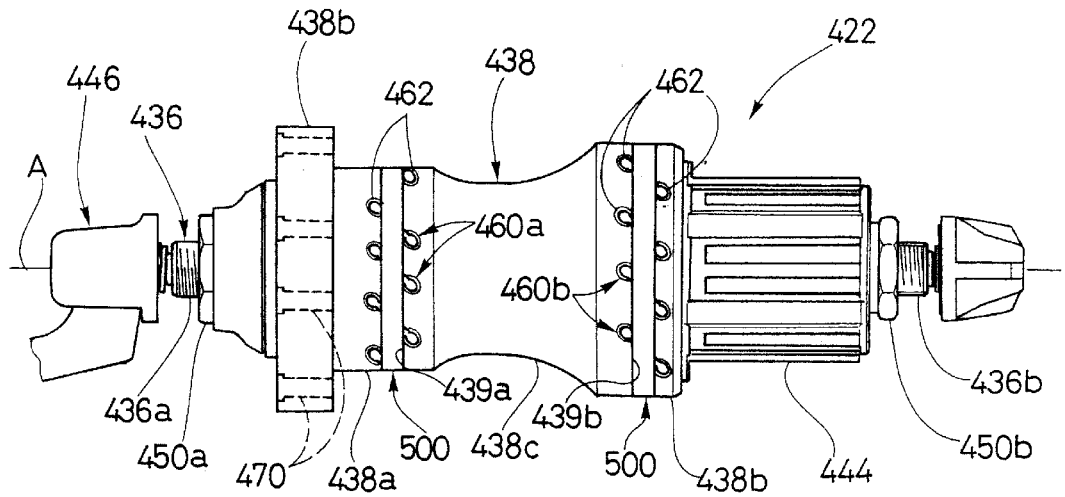
FIG. 32 is a side elevational view of a rear brake disk hub for a rear wheel, with spoke opening covers coupled thereto.
Figures 35, 36:
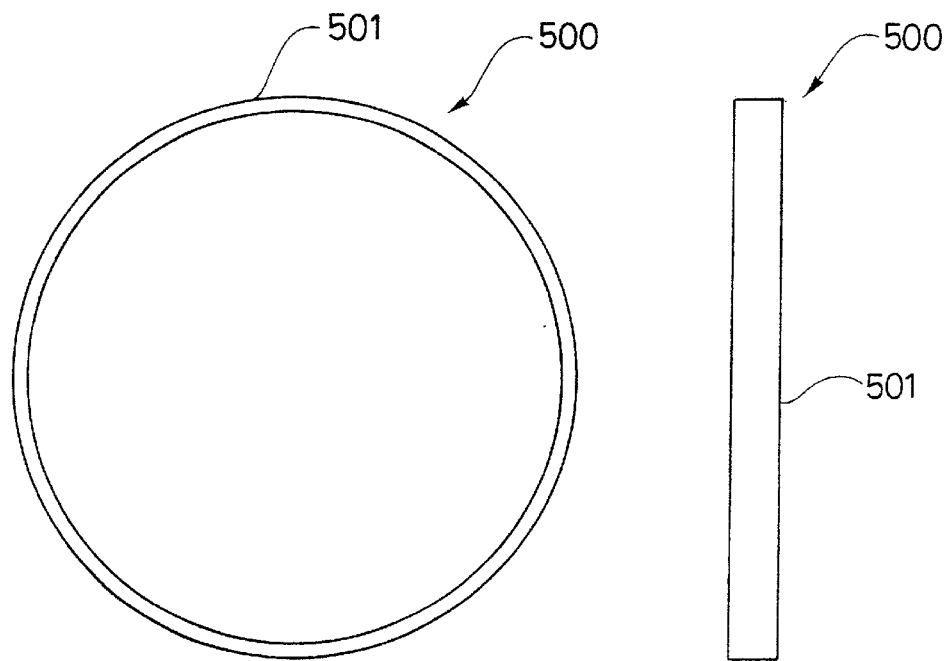
FIG. 35 is an end elevational view of a spoke opening cover illustrated in FIG. 32.
FIG. 36 is a side elevational view of the spoke opening cover illustrated in FIGS. 32 and 35 in accordance with the present invention.

As seen in FIGS. 35 and 36, a spoke opening cover 500 in accordance with another embodiment of the present invention is illustrated for use with the rear hub 422 of FIGS. 32 and 33. Of course, the spoke opening cover 500 can be used with other hubs disclosed herein. Although for purposes of brevity, the spoke opening cover 500 will only be illustrated with the rear hub 422.

The spoke opening cover 500 is used to limit or prevent contaminants from entering the hub body 438 via the spoke openings 460a or 460b, respectively. The spoke opening cover 500 can be used instead of the spoke seals 442a and 442b or in conjunction with the spoke seals 442a and 442b. The spoke opening cover 500 basically has a resilient tubular body 501 constructed from a flexible material such as rubber. The tubular body 501 of the spoke opening covers 500 are configured and dimensioned to snugly fit around the bicycle hub body 438 within the annular grooves 439a and 439b and to be substantially flush with the outer surface of the hub body 438 as seen in FIG. 32. The spoke opening cover 500 is installed on each end of the hub body 438 prior to installation of spokes 424. Of course, the annular grooves 439c and 439b can receive other types of spoke opening covers. For example, spoke opening covers 100' or 100" can be positioned within the annular grooves 439a and 439b so that the outer surfaces of the spoke opening covers 100' or 100" are flush with the outer surface of the hub body 438.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub for use with bicycle spokes, said bicycle hub comprising:

a hub axle having a center axis extending between a first end and a second end;

a hub body having an interior passageway with said hub axle being rotatably supported therein, a set of first spoke openings circumferentially arranged around said hub body;

a first flexible seal arranged in said interior passageway of said hub body and adjacent said first spoke openings to isolate said first spoke openings from said hub axle; and a first rigid seal support located beneath said first flexible seal to radially support said first flexible seal.

2. A bicycle hub according to claim 1, wherein said first flexible seal is an annular member with an inner surface.

3. A bicycle hub according to claim 2, wherein said first rigid seal support is an annular member with an outer surface that is configured to mate with said inner surface of said first flexible seal.

4. A bicycle hub according to claim 2, wherein said first flexible seal is positioned between said hub axle and said hub body to isolate a first interior section of said interior passageway adjacent said first spoke openings.

5. A bicycle hub according to claim 4, wherein said first interior section of said interior passageway is a continuous annular first space.

6. A bicycle hub according to claim 5, wherein each of said first spoke openings has an insertion portion with a large width that permits an enlarged head portion of a spoke to pass therethrough and a first retaining portion with a width that is smaller than said width of said insertion portion to retain the enlarged head portion of the spoke therein.

7. A bicycle hub according to claim 6, wherein said first flexible seal includes a first tubular section with at least one first flange extending radially outward from said first tubular section in a plane intersecting said insertion portions of said first spoke openings.

8. A bicycle hub according to claim 6, wherein said first flexible seal includes a first tubular section with a portion that is positioned to keep spokes in said first retaining portions of said first spoke openings.

9. A bicycle hub according to claim 6, wherein each of said first spoke openings includes a second retaining portion to retain the enlarged head portions of two spokes with in each of said first spoke openings.

10. A bicycle hub according to claim 9, wherein said first flexible seal includes a first tubular section with at least one first flange extending radially outward from said first tubular section in a plane intersecting said insertion portions of said first spoke openings.

11. A bicycle hub according to claim 9, wherein said first flexible seal includes a first tubular section with a portion that is positioned to keep spokes in said first and second retaining portions of said first spoke openings.

12. A bicycle hub according to claim 1, further comprising a freewheel coupled to said second end of said axle to rotate relative to said hub body.

13. A bicycle hub according to claim 1, wherein said hub body has an outer surface with a first annular groove, each of said first spoke openings has an insertion portion located along said first annular groove and a first retaining portion, said insertion portion having a large width that permits an enlarged head portion of a spoke to pass therethrough, and said first retaining portion having a width that is smaller than said width of said insertion portion to retain the enlarged head portion of the spoke therein.

14. A bicycle hub according to claim 13, further comprising a first spoke opening cover located with in said first annular groove.

15. A bicycle hub according to claim 14, wherein said first spoke opening cover has an outer surface that is flush with said outer surface of said hub body.

16. A bicycle hub according to claim 13, wherein said hub body further includes a second annular groove said outer surface and a set of second spoke openings circumferentially arranged around said hub body at a location that is axially spaced from said first spoke openings, each of said second spoke openings has an insertion portion located along said second annular groove and a first retaining portion, said insertion portions of said second spoke openings having large widths that permit enlarged head portions of spokes to pass therethrough, and said first retaining portions of said second spoke openings having a width that is smaller than said width of said insertion portion of second spoke openings to retain the enlarged head portions of the spokes therein.

17. A bicycle hub according to claim 16, further comprising a first spoke opening cover located with in said first annular groove, and a second spoke opening cover located with in said second annular groove.

18. A bicycle hub according to claim 17, wherein said first and second spoke opening covers have outer surfaces that are flush with said outer surface of said hub body.

19. A bicycle hub for use with bicycle spokes, said bicycle hub comprising:

a hub axle having a center axis extending between a first end and a second end; and a hub body having an outer surface with a first annular groove, an interior passageway with said hub axle being rotatably supported therein, a set of first spoke openings circumferentially arranged around said hub body, each of said first spoke openings has an insertion portion located along said first annular groove and a retaining portion, said insertion portion having a large width that permits an enlarged head portion of a spoke to pass therethrough, and said retaining portion having a width that is smaller than said width of said insertion portion to retain the enlarged head portion of the spoke therein.

20. A bicycle hub according to claim 19, further comprising a first spoke opening cover located with in said first annular groove.

21. A bicycle hub according to claim 20, wherein said first spoke opening cover has an outer surface that is flush with said outer surface of said hub body.

22. A bicycle hub according to claim 19, wherein said hub body further includes a second annular groove said outer surface and a set of second spoke openings circumferentially arranged around said hub body at a location that is axially spaced from said first spoke openings, each of said second spoke openings has an insertion portion located along said second annular groove and a first retaining portion, said insertion portions of said second spoke openings having large widths that permit enlarged head portions of spokes to pass therethrough, and said first retaining portions of said second spoke openings having a width that is smaller than said width of said insertion portion of second spoke openings to retain the enlarged head portions of the spokes therein.

23. A bicycle hub according to claim 22, further comprising a first spoke opening cover located with in said first annular groove, and a second spoke opening cover located with in said second annular groove.

24. A bicycle hub according to claim 23, wherein said first and second spoke opening covers have outer surfaces that are flush with said outer surface of said hub body.

* * * * *